United States Patent
Rahman et al.

(10) Patent No.: US 11,569,967 B2
(45) Date of Patent: Jan. 31, 2023

(54) METHOD AND APPARATUS FOR UPLINK CONTROL INFORMATION TRANSMISSION AND RECEPTION

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 219 days.

(21) Appl. No.: 16/566,562

(22) Filed: Sep. 10, 2019

(65) Prior Publication Data
US 2020/0084006 A1 Mar. 12, 2020

Related U.S. Application Data

(60) Provisional application No. 62/879,583, filed on Jul. 29, 2019, provisional application No. 62/733,261, (Continued)

(51) Int. Cl.
*H04L 5/00* (2006.01)
*H04B 7/0417* (2017.01)
(Continued)

(52) U.S. Cl.
CPC ......... *H04L 5/0057* (2013.01); *H04B 7/0417* (2013.01); *H04B 7/0626* (2013.01); *H04W 72/042* (2013.01); *H04W 72/0413* (2013.01)

(58) Field of Classification Search
CPC ... H04B 7/0417; H04B 7/0626; H04L 5/0057; H04L 5/0094; H04W 72/0413; H04W 72/042
See application file for complete search history.

(56) References Cited

U.S. PATENT DOCUMENTS 9,119,203 B2   8/2015  Ahn et al.
2008/0227448 A1  9/2008  Kim et al.
(Continued)

FOREIGN PATENT DOCUMENTS

EP   3701639 A1   9/2020
EP   3625924 B1   5/2021
(Continued)

OTHER PUBLICATIONS

Samsung, "CSI reporting and UCI multiplexing", 3GPP TSG RAN WG1 Meeting NR #3, Sep. 18-21, 2017, R1-1715939, 9 pages.
(Continued)

*Primary Examiner* — Derrick V Rose

(57) ABSTRACT

A method of a user equipment (UE) in a wireless communication system is provided. The method comprises: receiving, from at least one base station (BS) of a group of (N) BSs, channel state information (CSI) configuration information including a number of uplink control information (UCI) parts for a CSI reporting; identifying the number of UCI parts for the CSI reporting; determining a CSI report based on the identified number of UCI parts; identifying one or more BSs in the group of (N) BSs to transmit the determined CSI report; and transmitting, to the one or more identified BSs, via an uplink channel, a UCI including the determined CSI report, wherein the UCI includes the identified number of UCI parts each of which includes a part of the determined CSI report.

20 Claims, 11 Drawing Sheets

Related U.S. Application Data filed on Sep. 19, 2018, provisional application No. 62/730,319, filed on Sep. 12, 2018.

(51) Int. Cl.
  *H04B 7/06* (2006.01)
  *H04W 72/04* (2009.01)

(56) References Cited

U.S. PATENT DOCUMENTS

| | | | |
|---|---|---|---|
| 2016/0165631 A1 | 6/2016 | Gao et al. | |
| 2017/0272220 A1 | 9/2017 | Chen et al. | |
| 2019/0109626 A1* | 4/2019 | Park | H04L 5/0048 |
| 2019/0230648 A1* | 7/2019 | Kim | H04L 1/0004 |
| 2019/0342768 A1* | 11/2019 | Xu | H04B 7/0639 |
| 2020/0177254 A1* | 6/2020 | Lee | H04B 7/0626 |

FOREIGN PATENT DOCUMENTS

| | | |
|---|---|---|
| KR | 10-2016-0093533 A | 8/2016 |
| WO | 2011/162520 A2 | 12/2011 |
| WO | 2019/160384 A1 | 8/2019 |

OTHER PUBLICATIONS

International Search Report dated Jan. 9, 2020 in connection with International Patent Application No. PCT/KR2019/011885, 3 pages.
Written Opinion of the International Searching Authority dated Jan. 9, 2020 in connection with International Patent Application No. PCT/KR2019/011885, 4 pages.
"LTE; Evolved Universal Terrestrial Radio Access (E-UTRA); Physical channels and modulation (3GPP TS 36.211 version 14.4 0 Release 14)", ETSI TS 136 211 V14.4.0, Oct. 2017, 199 pages.
"3rd Generation Partnership Project; Technical Specification Group Radio Access Network; Evolved Universal Terrestrial Radio Access (E-UTRA); Multiplexing and channel coding (Release 14)", 3GPP TS 36.212 V14.4.0, Sep. 2017, 198 pages.
"LTE; Evolved Universal Terrestrial Radio Access (E-UTRA); Physical later procedures (3GPP TS 36.213 version 14.4 0 Release 14)", ETSI TS 136 213 V14 4.0, Oct. 2017, 464 pages.
"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.4.0, Sep. 2017, 108 pages.
"3rd Generation Partnership Project; Technical Specification Group Radio Access Network; Evolved Universal Terrestrial Radio Access (E-UTRA); Radio Resource Control (RRC); Protocol Specification (Release 14)", 3GPP TS 36.331 V14.4.0, Sep. 2017, 753 pages.
"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.
"3rd Generation Partnership Project; Technical Specification Group Radio Access Network; NR; Multiplexing and channel coding (Release 15)", 3GPP TS 38.212 V15.0 0, Dec. 2017, 82 pages.
"3rd Generation Partnership Project; Technical Specification Group Radio Access Network; NR; Physical layer procedures for data (Release 15)", 3GPP TS 38.214 V15.0.0, Dec. 2017, 71 pages.
Supplementary European Search Report dated Oct. 7, 2021 in connection with European Patent Application No. 19 86 0739, 11 pages.

\* cited by examiner

METHOD AND APPARATUS FOR UPLINK CONTROL INFORMATION TRANSMISSION AND RECEPTION

CROSS-REFERENCE TO RELATED APPLICATIONS AND CLAIM OF PRIORITY

The present application claims priority to: U.S. Provisional Patent Application Ser. No. 62/730,319 filed on Sep. 12, 2018; U.S. Provisional Patent Application Ser. No. 62/733,261 filed on Sep. 19, 2018; and U.S. Provisional Patent Application Ser. No. 62/879,583 filed on Jul. 29, 2019. The content of the above-identified patent documents is incorporated herein by reference.

TECHNICAL FIELD

The present disclosure relates generally to CSI acquisition to enable DL MIMO for next generation cellular systems. In particular, DL or/and UL signaling support for enabling transmission/reception of uplink control information carrying the CSI for multiple gNBs/TRPs is presented.

BACKGROUND

Understanding and correctly estimating the channel in an advance wireless communication system between a user equipment (UE) and an gNode B (gNB) is important for efficient and effective wireless communication. In order to correctly estimate the channel conditions, the UE may report (e.g., feedback) information about channel measurement, e.g., CSI, to the gNB. With this information about the channel, the gNB is able to select appropriate communication parameters to efficiently and effectively perform wireless data communication with the UE.

SUMMARY

Embodiments of the present disclosure provide methods and apparatuses for CSI acquisition to enable DL MIMO for next generation cellular systems in an advanced wireless communication system.

In one embodiment, a user equipment (UE) in a wireless communication system is provided. The UE comprises a transceiver configured to receive, from at least one base station (BS) of a group of (N) BSs, channel state information (CSI) configuration information including a number of uplink control information (UCI) parts for a CSI reporting. The UE further comprises a processor operably connected to the transceiver, the processor, based on the CSI configuration information, configured to: identify the number of UCI parts for the CSI reporting; determine a CSI report based on the identified number of UCI parts; and identify one or more BSs in the group of (N) BSs to transmit the determined CSI report. The UE further comprises the transceiver configured to transmit, to the one or more identified BSs, via an uplink channel, a UCI including the determined CSI report. The UCI includes the identified number of UCI parts each of which includes a part of the determined CSI report.

In another embodiment, a base station (BS) in a wireless communication system is provided. The BS comprises a processor configured to determine a number of uplink control information (UCI) parts for a CSI reporting. The BS further comprises a transceiver operably connected to the processor, the transceiver configured to: transmit, to a user equipment (UE) channel state information (CSI) configuration information including the determined number of UCI parts for the CSI reporting; and receive, from the UE via an uplink channel, a UCI including a CSI report, wherein the CSI report is based on the determined number of UCI parts, wherein the UCI includes the determined number of UCI parts each of which includes a part of the CSI report, and wherein the BS is at least one BS of a group of (N) BSs.

In yet another embodiment, a method of a user equipment (UE) in a wireless communication system is provided. The method comprises: receiving, from at least one base station (BS) of a group of (N) BSs, channel state information (CSI) configuration information including a number of uplink control information (UCI) parts for a CSI reporting; identifying the number of UCI parts for the CSI reporting; determining a CSI report based on the identified number of UCI parts; identifying one or more BSs in the group of (N) BSs to transmit the determined CSI report, and transmitting, to the one or more identified BSs, via an uplink channel, a UCI including the determined CSI report, wherein the UCI includes the identified number of UCI parts each of which includes a part of the determined CSI report.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
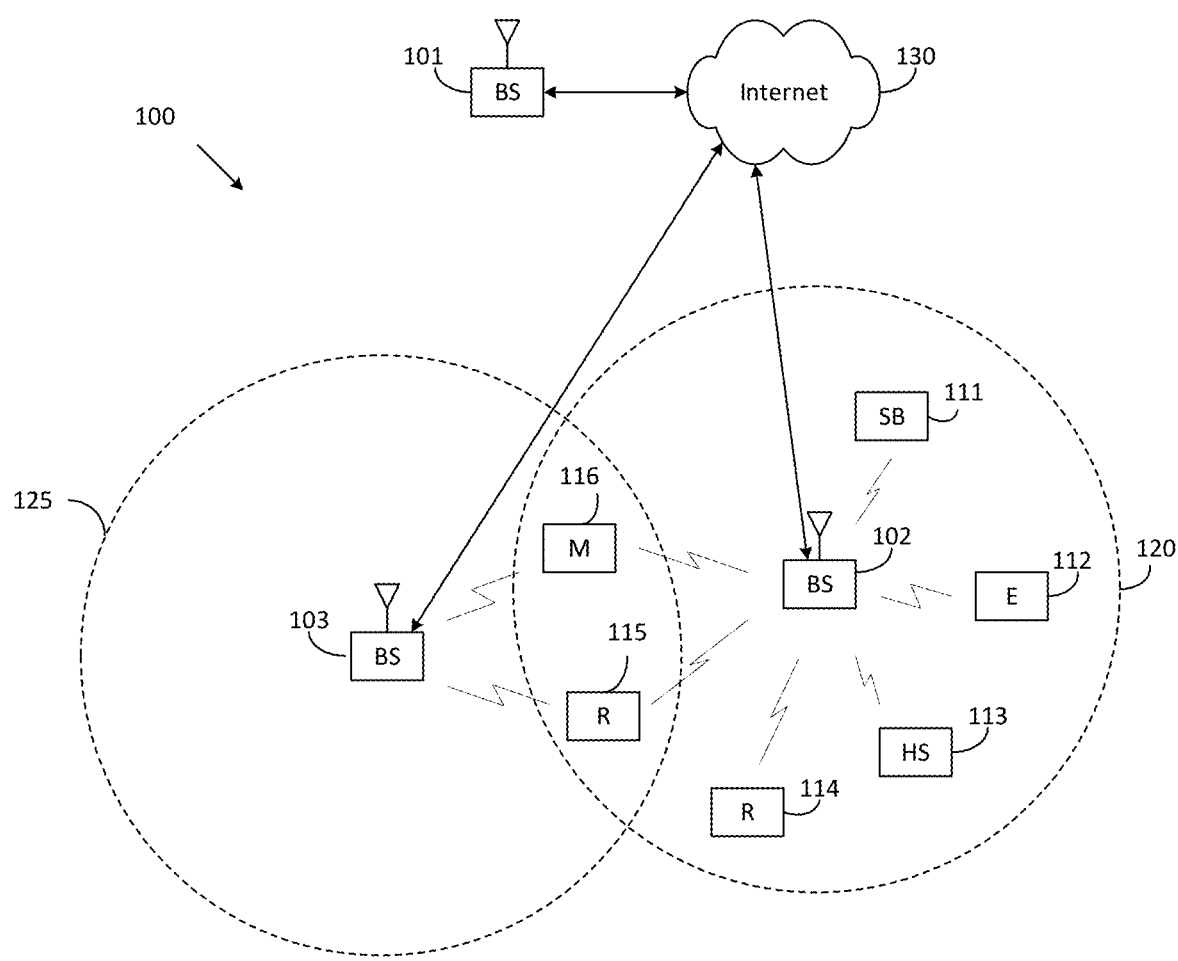
FIG. 1 illustrates an example wireless network according to embodiments of the present disclosure.

FIG. 1 through FIG. 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v15.6.0, "E-UTRA, Physical channels and modulation;" 3GPP TS 36.212 v15.6.0, "E-UTRA, Multiplexing and Channel coding;" 3GPP TS 36.213 v15.6.0, "E-UTRA, Physical Layer Procedures;" 3GPP TS 36.321 v15.6.0, "E-UTRA, Medium Access Control (MAC) protocol specification;" 3GPP TS 36.331 v15.6.0, "E-UTRA, Radio Resource Control (RRC) Protocol Specification;" 3GPP TR 22.891 v1.2.0, "Study on New Services and Markets Technology Enablers;" 3GPP TS 38.212 v15.6.1, "E-UTRA, NR, Multiplexing and Channel coding;" and 3GPP TS 38.214 v15.6.1, "E-UTRA, NR, Physical layer procedures for data."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
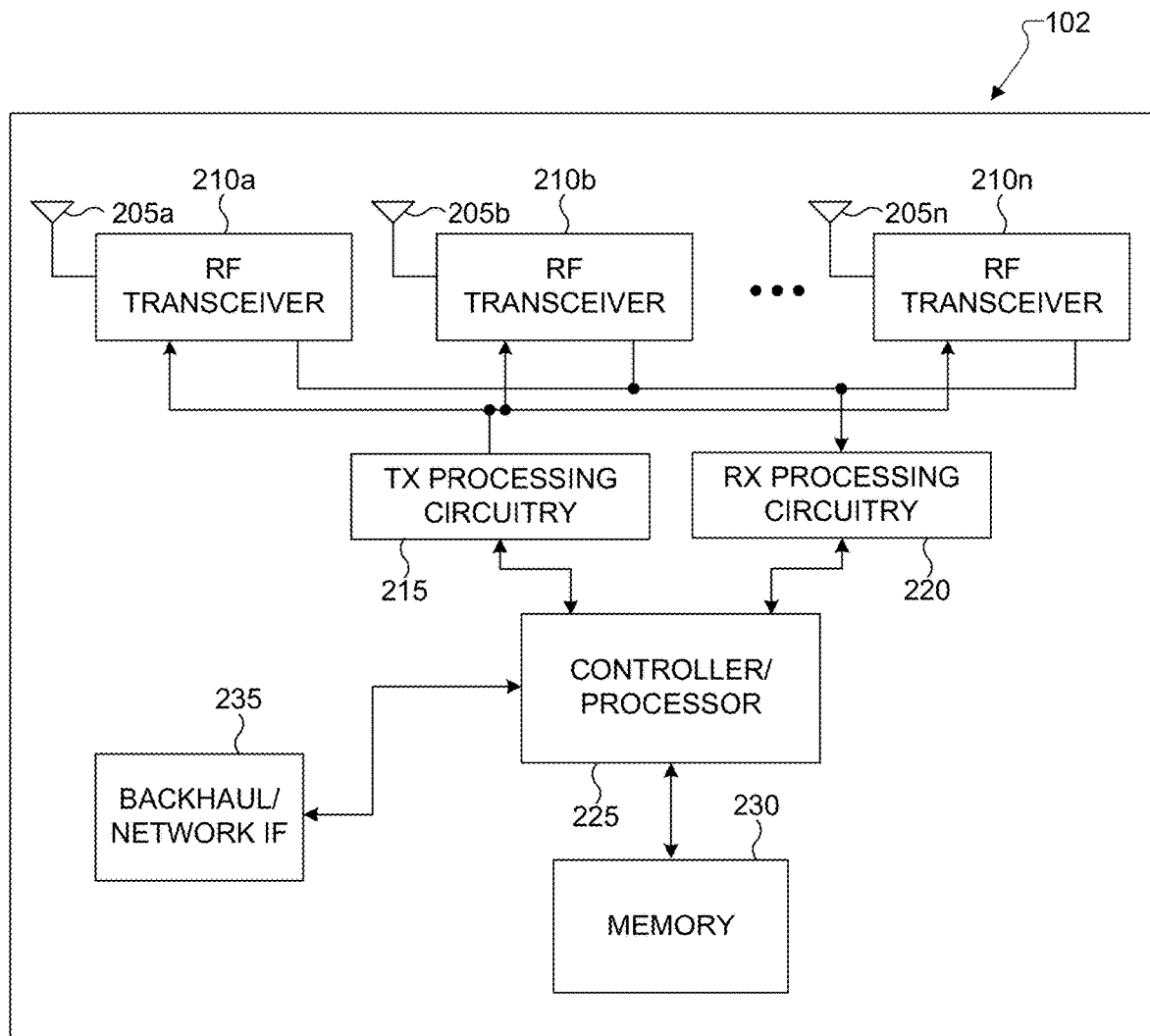
FIG. 2 illustrates an example gNB according to embodiments of the present disclosure.
Figure 3:
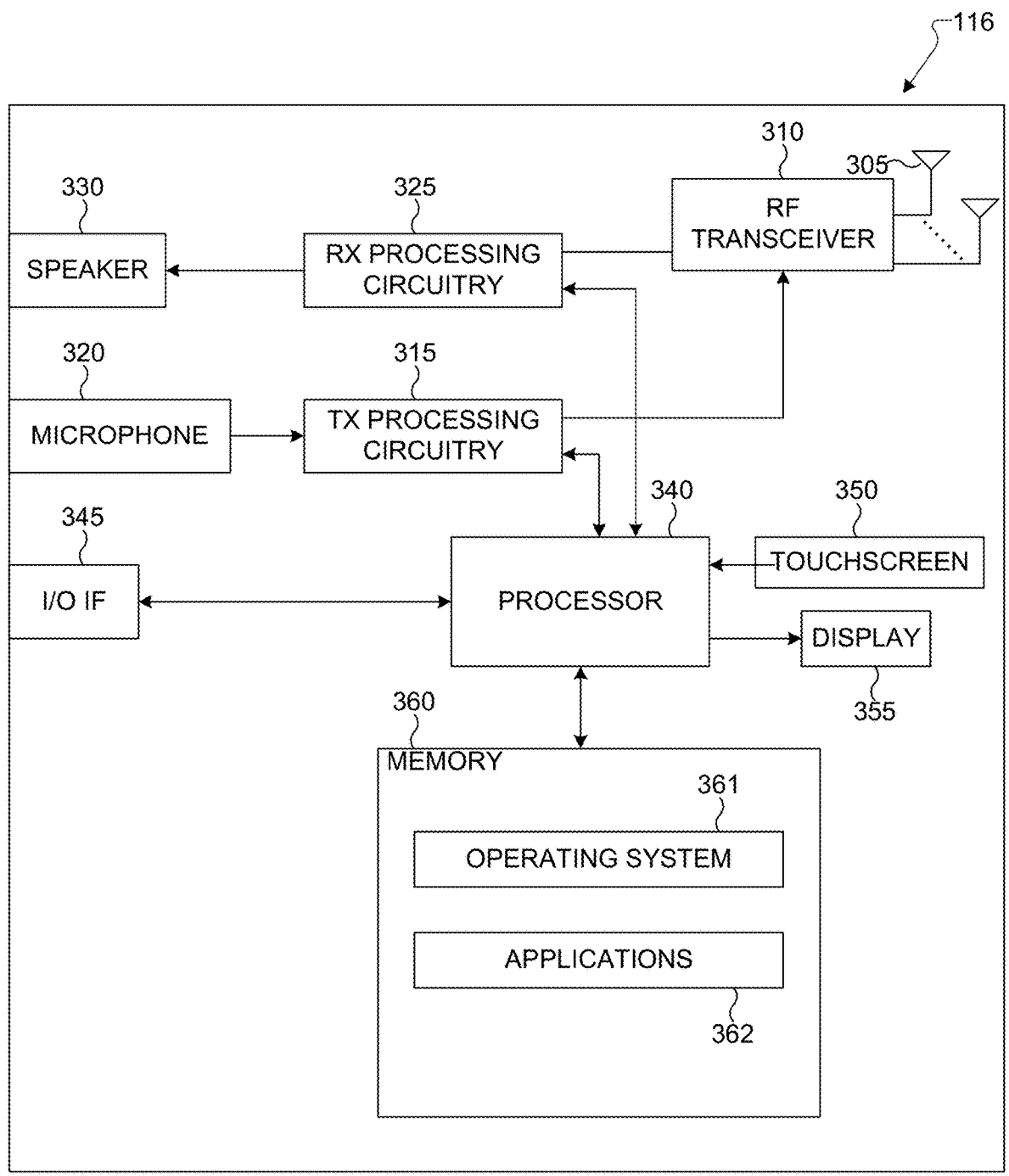
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station (BS)), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for CSI reporting in an advanced wireless communication system. In certain embodiments, and one or more of the gNBs 101-103 includes circuitry, programing, or a combination thereof, for CSI acquisition in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
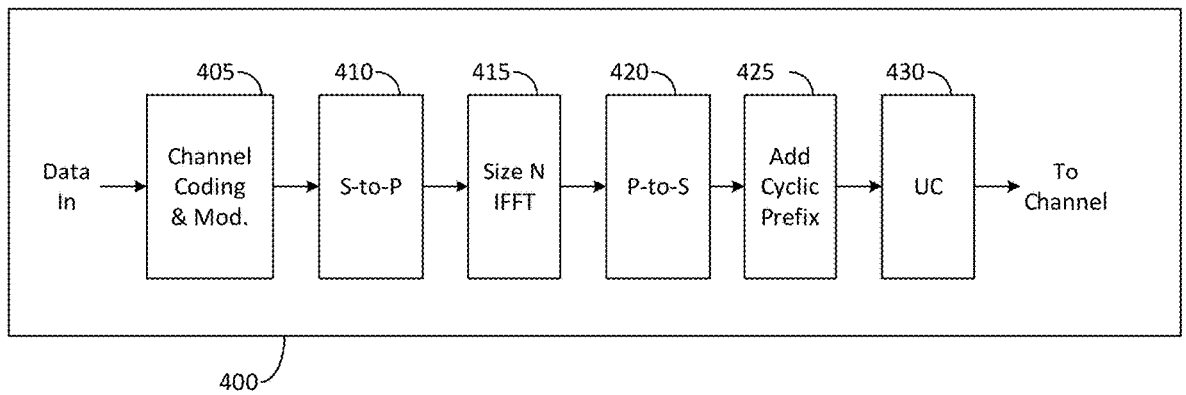
FIG. 4A illustrates a high-level diagram of an orthogonal frequency division multiple access transmit path according to embodiments of the present disclosure.
Figure 4B:
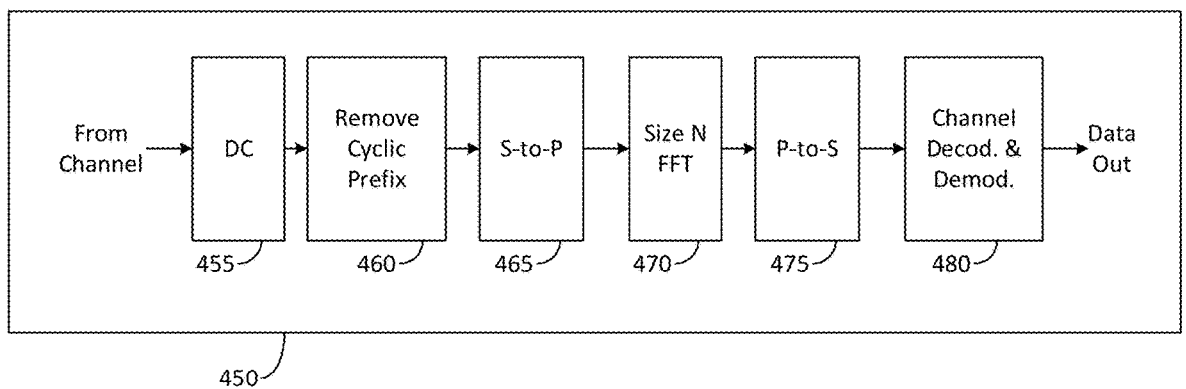
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is an RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
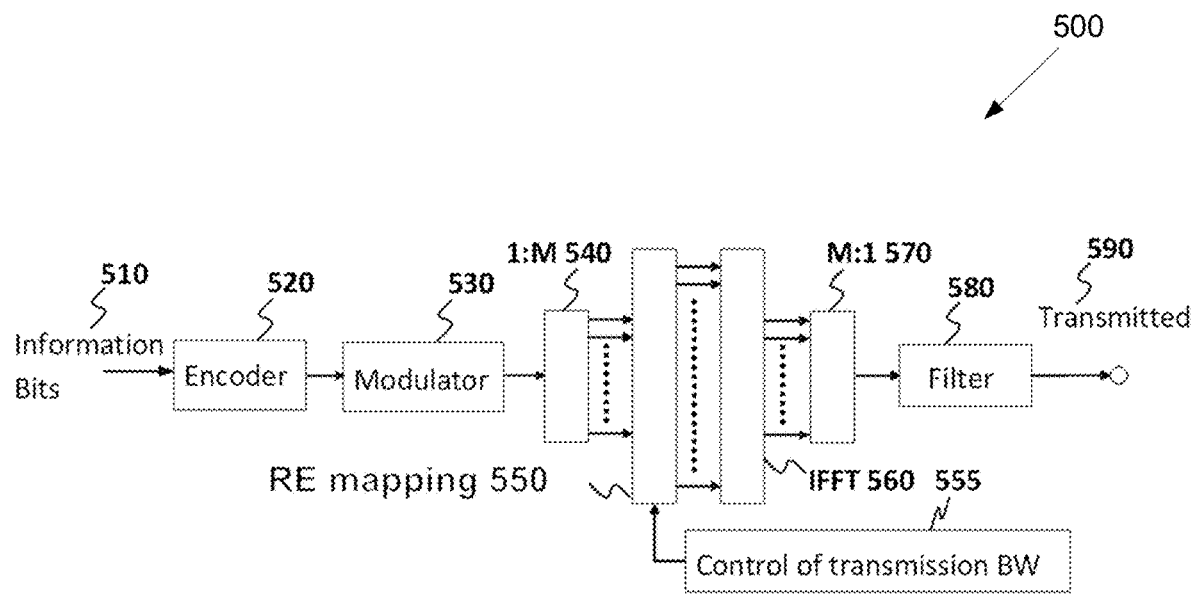
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of the present disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
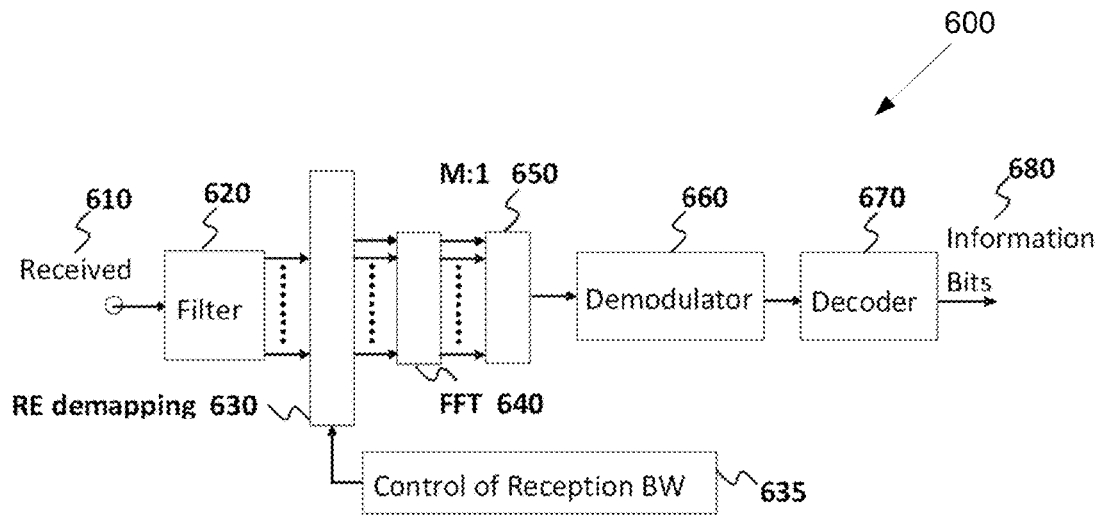
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of the present disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
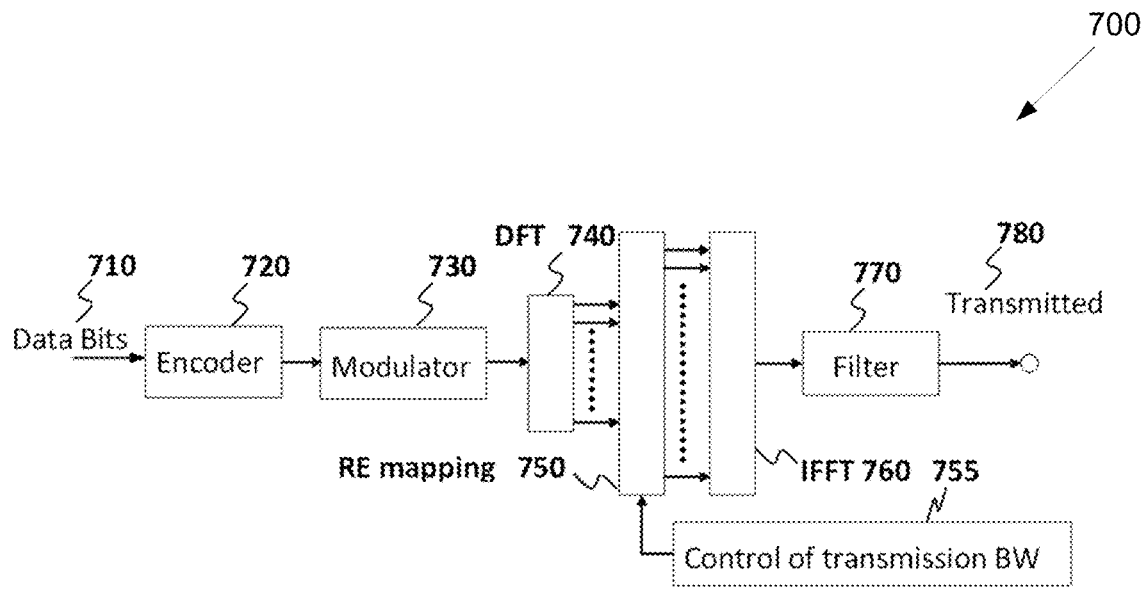
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of the present disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
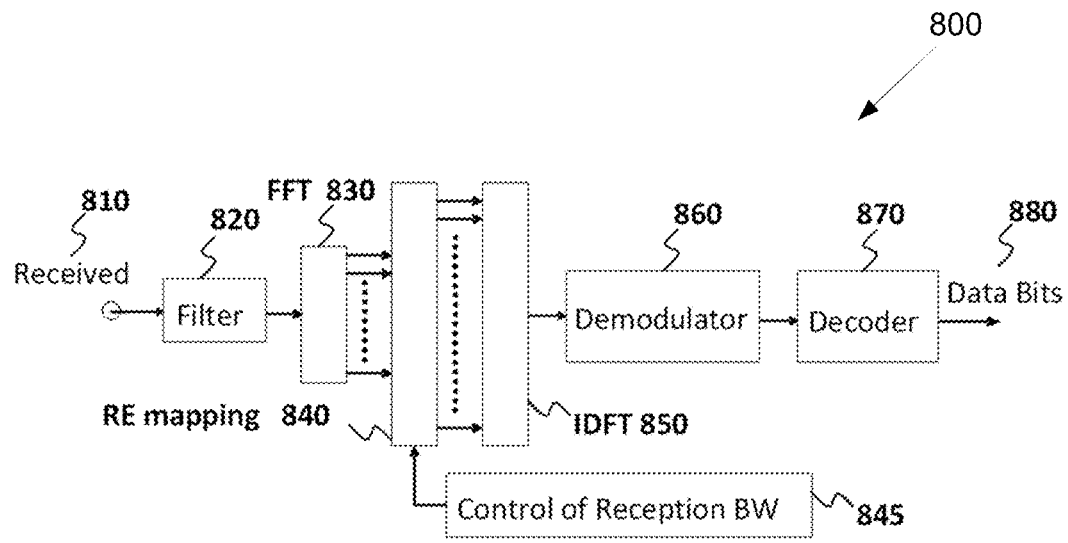
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of the present disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in 3GPP specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
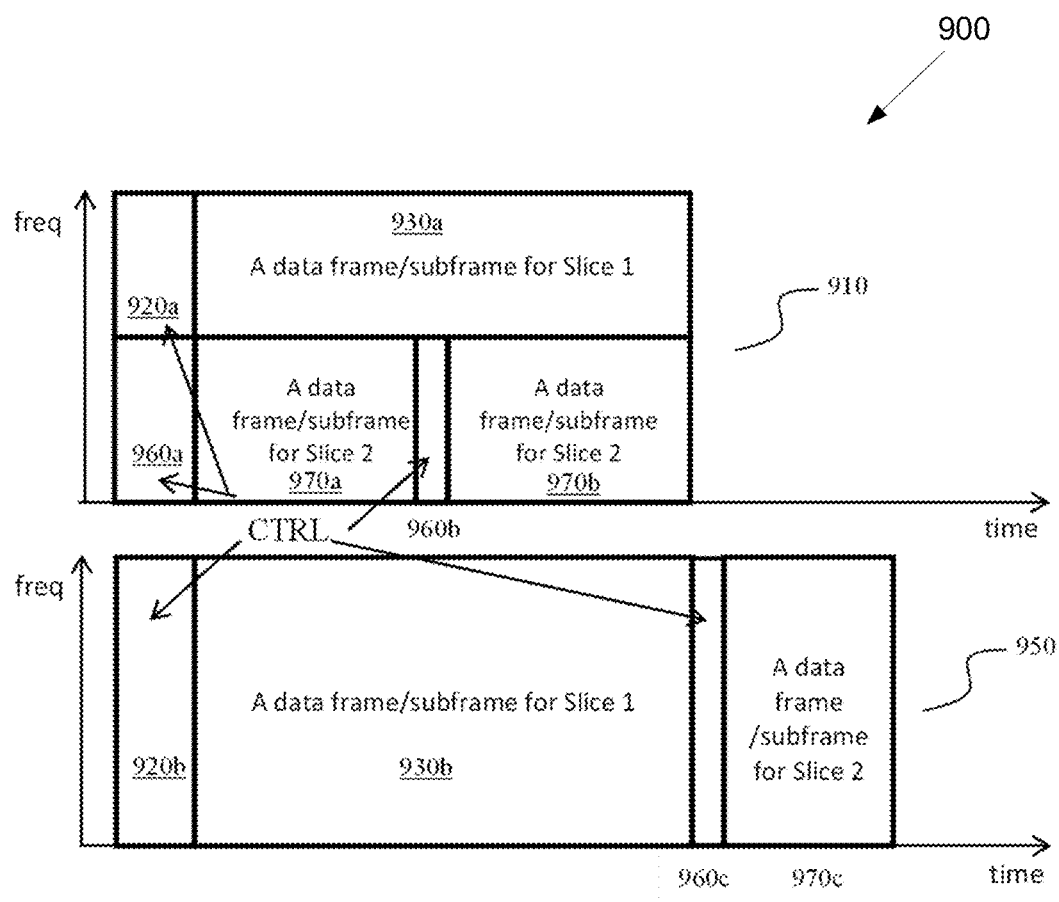
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of the present disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920*a*, 960*a*, 960*b*, 920*b*, or 960*c*) and a data component (e.g., 930*a*, 970*a*, 970*b*, 930*b*, or 970*c*). In embodiment 910, the two slices are multiplexed in frequency domain whereas in embodiment 950, the two slices are multiplexed in time domain. These two slices can be transmitted with different sets of numerology.

3GPP specification supports up to 32 CSI-RS antenna ports which enable an gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
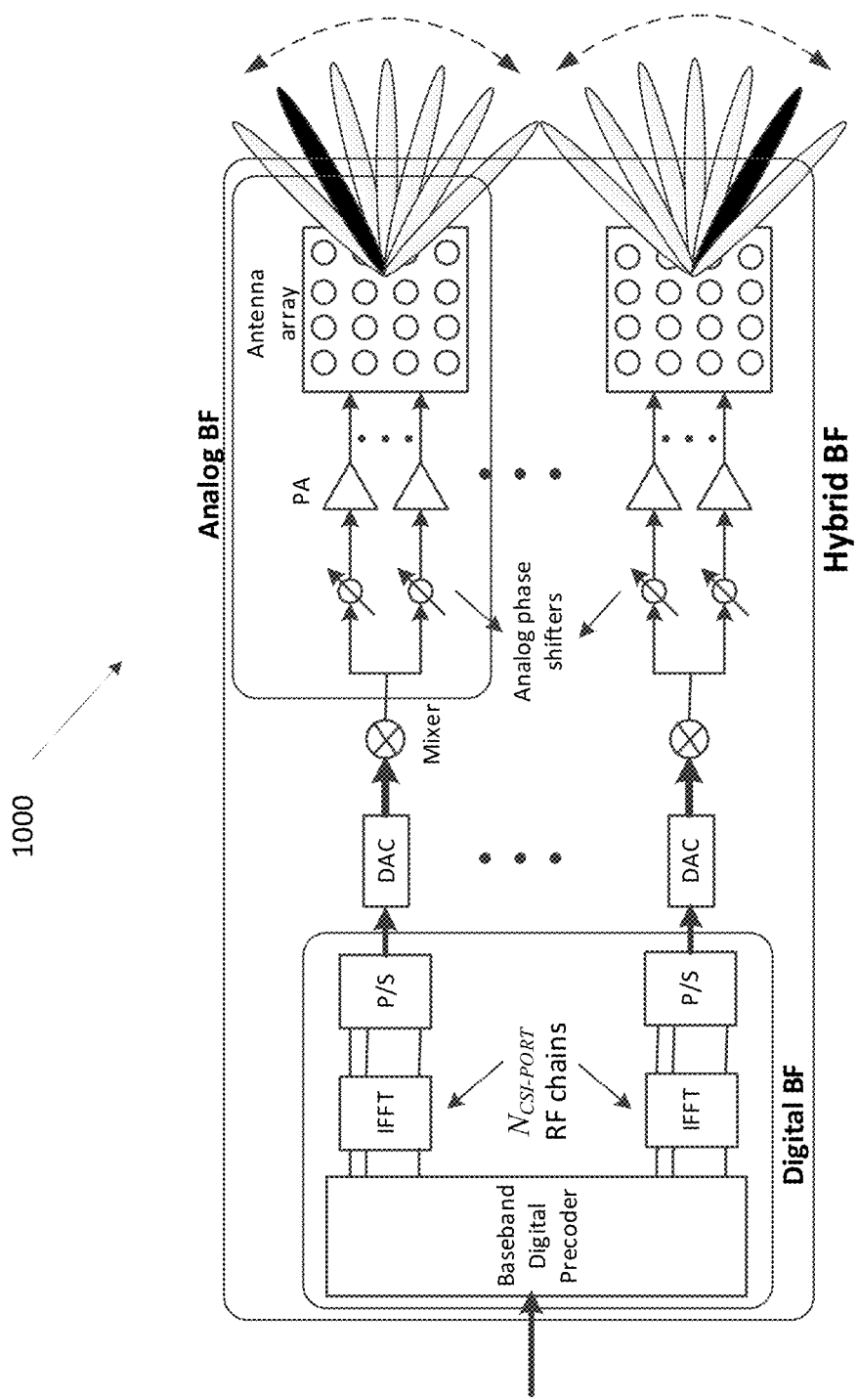
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of the present disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanism corresponding to three types of CSI-RS measurement behavior are supported in LTE: (1) "CLASS A" CSI reporting which corresponds to non-precoded CSI-RS, (2) "CLASS B" reporting with K=1 CSI-RS resource which corresponds to UE-specific beamformed CSI-RS, and (3) "CLASS B" reporting with K>1 CSI-RS resources which corresponds to cell-specific beamformed CSI-RS. For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (consisting of multiple ports). Here, (at least at a given time/frequency) CSI-RS ports have narrow beam widths and hence not cell wide coverage, and (at least from the eNB perspective) at least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of its representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

From LTE Rel. 8 to Rel. 14 eFD-MIMO, MIMO has been identified as an essential feature in order to achieve high system throughput requirements and it will continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB, and CSI acquisition and feedback from UE. In legacy (up to LTE Rel. 13) FDD systems, the CSI feedback framework is 'implicit' in the form of CQI/PMI/RI (and CRI in Rel. 13) derived from a codebook assuming SU transmission from eNB.

For 5G or NR systems (Rel. 15), [REF7, REF8], the above-mentioned CSI reporting paradigm from LTE is also supported and referred to as Type I CSI reporting. In addition to Type I, a high-resolution CSI reporting, referred to as Type II CSI reporting, is also supported to provide more accurate CSI information to gNB for use cases such as high-order MU-MIMO. In general, the Type I or Type II CSI reported using a PMI codebook, where the PMI has two components, the first PMI i1 and the second PMI i2. If the subband CSI reporting is configured, then the UE reports a single wideband first PMI i1 which indicates a group of beams/pre-coders, and one second PMI i2 for each subband which indicates a precoder belonging to the group of precoders indicated by the reported first PMI i1. The subband CSI reporting is generally configured for use cases such as MU-MIMO transmission since the precoding is known to be frequency-selective (i.e., varies from one subband to another subband). The system performance depends on the PMI codebook. For example, the PMI codebook for Type I CSI reporting performs worse than that for Type II CSI reporting, but the performance is proportional to the size of the PMI codebook which determines the CSI reporting payload (number of feedback bits). In fact, the Type I CSI reporting payload is much smaller than the Type II CSI reporting payload. So, the system performance gain is directly proportional to the PMI codebook and hence to the CSI reporting payload.

The above-mentioned dependence on the PMI codebook can be replaced or weakened if the gNB or network has some rough a priori information about the subspace of the DL channel (e.g. a subset of the PMI codebook). For example, the gNB can beamform multiple CSI-RS resources, each with 1 port, using a few candidate beamforming vectors, and the UE can report (select) one of these resources in each subband (e.g. via CRI) in order to report subband CSI. With this approach, the gNB has the flexibility to choose any candidate beamforming vectors, i.e., the reliance on PMI codebook to report subband CSI is not needed. Note also that this approach is also applicable to UL MIMO wherein the UE beamforms multiple SRS resources, each with 1 port, using a few candidate beamforming vectors, and the gNB can report (indicate) one of these resources in each subband (e.g. via SRI) in order to report subband CSI for UL.

For DL, one such CSI reporting mechanism, referred to as 'non-PMI feedback' is supported in Rel. 15 of NR specification [REF 8] in which the UE is configured to report CRI/RI/CQI without any PMI to a single gNB/TRP. This CSI reporting mechanism can be extended/generalized to multiple gNBs/TRPs. One use case for such CSI reporting is the case when a large number of gNBs/TRPs are deployed in a small geographic area (such as indoor building), where each gNB/TRP has a small number of antenna ports (e.g. 1). Another use case would be millimeter wave communication systems (referred to as FR2 in 3GPP NR specification) in which each gNB/TRP is beamformed to a small number of antenna ports or TXRU. Yet another use case would be URLL applications. In this settings, since a UE can be configured to report CSI for multiple TRPs/gNBs, where the number of TRPs/gNBs can change dynamically, how the CSI is reported via UCI needs to be determined at the UE. This disclosure proposes a few solutions to this problem.

Figure 11:
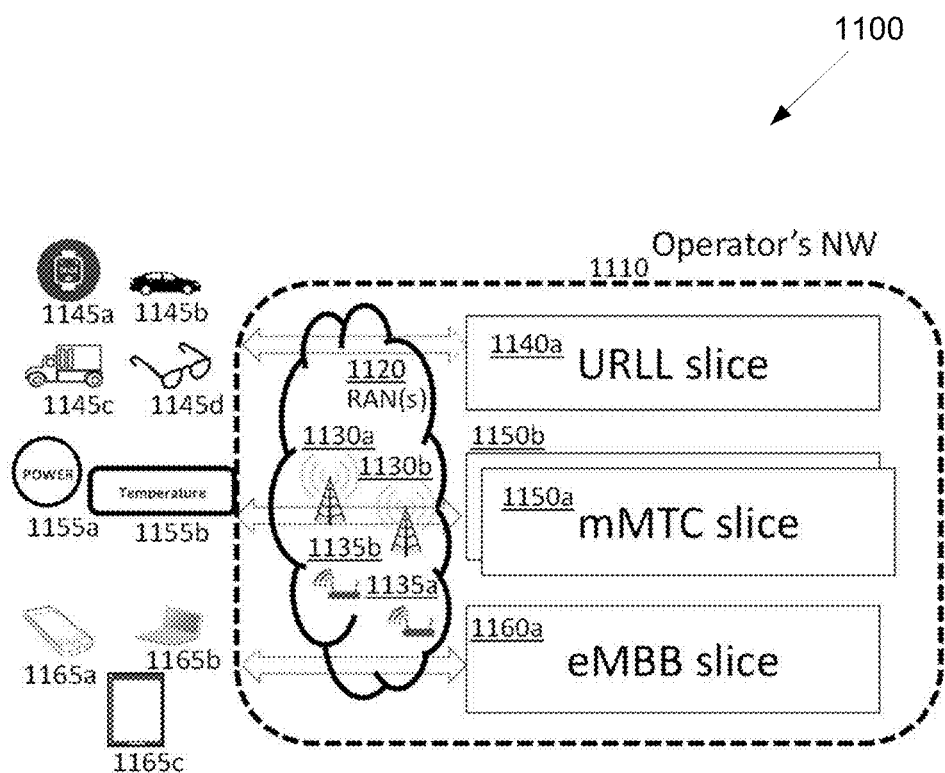
FIG. 11 illustrates an example network configuration according to embodiments of the present disclosure.

FIG. 11 illustrates an example network configuration 1100 according to embodiments of the present disclosure. The embodiment of the network configuration 1100 illustrated in FIG. 11 is for illustration only. FIG. 11 does not limit the scope of the present disclosure to any particular implementation of the configuration 1100.

In order for the 5G network to support such diverse services with different quality of services (QoS), one scheme has been identified in 3GPP specification, called network slicing.

As shown in FIG. 11, An operator's network 1110 includes a number of radio access network(s) 1120 (RAN(s)) that are associated with network devices such as gNBs 1130a and 1130b, small cell base stations (femto/pico gNBs or Wi-Fi access points) 1135a and 1135b. The network 1110 can support various services, each represented as a slice.

In the example, an URLL slice 1140a serves UEs requiring URLL services such as cars 1145b, trucks 1145c, smart watches 1145a, and smart glasses 1145d. Two mMTC slices 1150a and 550b serve UEs requiring mMTC services such as power meters 555b, and temperature control box 1155b. One eMBB slice 1160a serves UEs requiring eMBB services such as cells phones 1165a, laptops 1165b, and tablets 1165c. A device configured with two slices can also be envisioned.

Throughout the present disclosure, a CSI-RS resource refers to a non-zero power (NZP) CSI-RS resource, unless stated otherwise.

In one embodiment 1, a UE is configured (e.g., via higher layer RRC signaling) to measure multiple ($N_g$>1) CSI-RS resource sets comprising non-zero power (NZP) CSI-RS resources for channel measurement.

In one example, each of $N_g$>1 CSI-RS resource sets is associated with antenna ports at a TRP/gNB (or antenna panel): set $S_1$ comprising $N_{CSI-RS,1}$≥1 CSI-RS resources for TRP #1; set $S_2$ comprising $N_{CSI-RS,2}$≥1 CSI-RS resources for TRP #2; . . . set $S_{N_g}$ comprising $N_{CSI-RS,N_g}$≥1 CSI-RS resources from TRP #$N_g$. Alternatively, the $N_g$>1 sets comprise a single CSI-RS resource set. i.e., each of the $N_g$ sets is equivalent to a subset of the single CSI-RS resource set.

Likewise, the UE is also configured (e.g., via higher layer RRC signaling) to measure multiple ($N_g$>1) resource sets for interference measurement, where each resource set comprises either NZP CSI-RS resources or zero power (ZP) CSI-RS resources or CSI-IM resources. In one example, each interference resource set is associated with antenna ports at a TRP/gNB (or antenna panel): set $I_1$ comprising $N_{Interf,1}$≥1 interference resources for TRP #1; set $I_2$ comprising $N_{Interf,2}$≥1 interference resources for TRP #2; . . . set $I_{N_g}$ comprising $N_{Interf,N_g}$≥1 interference resources from TRP # $N_g$. Alternatively, the $N_g$>1 interference resource sets comprise a single interference measurement resource set. i.e., each of the $N_g$ sets is equivalent to a subset of the single interference measurement resource set.

The UE is further configured to derive CSI using the measured channel or/and interference based on multiple ($N_g$) resource sets for channel or/and interference measurement, and report the UCI carrying the derived CSI to one or multiple of the $N_g$ gNBs/TRPs, where the UCI is reported either as a one-part UCI or a two-part UCI comprising UCI 1 and UCI 2. Whether to report UCI as one-part or two-part can be configured via DCI based signaling. Alternatively, such a configuration is signaled semi-statically via higher layer (RRC) or more dynamic MAC CE based signaling.

If the UCI is reported as a one-part UCI, then the UCI carries the whole CSI for multiple ($N_g$) gNBs/TRPs. Otherwise (i.e., if UCI is reported as a two-part UCI), then the UCI carrying the CSI for multiple ($N_g$) gNBs/TRPs is divided (partitioned) into two parts, where a UCI part 1 (UCI 1) carries a subset of the CSI reports for multiple gNBs/TRPs (i.e., CSI part 1), and the UCI part 2 carries the remaining CSI reports for multiple gNBs/TRPs (i.e., CSI part 2).

In this example, the CSI part 1 has fixed payload (number of bits) and the corresponding UCI part 1 (UCI 1) is always reported. The CSI part 2 can have variable payload (number of bits) and the corresponding UCI part 2 (UCI 2) may or may not be reported. For example, the UCI part 2 is not reported if the CSI part 2 has zero payload (i.e., not reported). At least one of the following alternative (Alt) is used for the information about the size of the CSI part 2 or the UCI part 2.

In one alternative, the information about the size of the CSI part 2 or the UCI part 2 is included in the UCI or the CSI part 1. In one example, the information includes a number (N) of TRPs (out of the total $N_g$) whose CSIs are reported in the UCI part 2. In another example, the information includes a number ($N_2$) of TRPs (out of the remaining $N_g-N_1$) whose CSIs are reported in the UCI part 2, where $N_1$ and $N_2$ respectively are number of TRPs whose CSIs are included in the UCI part 1 and part 2. In another example, the information includes a bitmap that indicates whether CSI for a TRP associated with the UCI part 2 is reported or not. The length of the bitmap can be $N_2$. The information about the size of the CSI part 2 or UCI part 2 can be explicit as a separate CSI component in CSI part 1 or implicit with one of the CSI components in CSI part 1, for example with RI (if reported) or with CRI.

In another alternative, the information about the size of the CSI part 2 or UCI part 2 is configured to the UE. For example, such a configuration is signaled via DCI or higher layer (RRC) or MAC CE based signaling.

In one example, the UCI part 1 carries the CSI for the primary TRP (i.e., TRP #1), and also includes the information about the number ($N_2 \geq 0$) of the remaining TRPs (e.g., TRP #i, where i>1) whose CSIs are reported using the UCI part 2. The UCI part 2 carries CSIs of the $N_2$ of the remaining TRPs (e.g., TRP #i, where i>1). Note that the UCI part 2 payload varies (since $N_2$ varies), in particular, the UCI part 2 is not reported if $N_2$=0. If $N_g$>2 and $N_g-1>N_2$ (i.e., number of remaining TRPs>number of TRPs whose CSI is reported via the UCI part 2), then an indication is needed to indicate the indices of the TRPs whose CSIs are reported. Such indication can be included in either the UCI 1 or the UCI 2.

In another example, a UCI part 1 carries the CSI for the primary TRP (i.e., TRP #1), and also includes the information (e.g., a bitmap) about the indices of the TRPs whose CSIs are reported using the UCI part 2. The UCI part 2 carries CSIs of the $N_2$ of the remaining TRPs (e.g., TRP #i, where i>1). Note that the UCI part 2 payload varies (since $N_2$ varies), in particular, the UCI part 2 is not reported if $N_2$=0.

In another example, a UCI part 1 carries the CSI for one of the $N_g$ TRPs (e.g., the primary TRP #1), and also includes the information about the number ($N_2 \geq 0$) of the remaining TRPs (e.g., TRP #i, where i>1) whose CSIs are reported using a UCI part 2. The UCI part 2 carries CSIs of the $N_2$ of the remaining TRPs (e.g., TRP #i, where i>1). Note that the UCI part 2 payload varies (since $N_2$ varies), in particular, the UCI part 2 is not reported if $N_2$=0. If $N_g$>2 and $N_g-1>N_2$ (i.e., number of remaining TRPs>number of TRPs whose CSI is reported via the UCI part 2), then an indication is needed to indicate the indices of the TRPs whose CSIs are reported in the UCI 2. Such indication can be included in one of the UCI 1 and the UCI 2. The index of the TRP whose CSI is reported in the UCI 1 is also reported via the UCI 1.

In another example, a UCI part 1 carries the CSI for one of the $N_g$ TRPs (e.g., the primary TRP #1), and also includes the information (e.g., a bitmap B) about the indices of the TRPs whose CSIs are reported using a UCI part 2. The UCI part 2 carries CSIs of the $N_2$ of the remaining TRPs (e.g., TRP #i, where i>1). Note that the UCI part 2 payload varies (since $N_2$ varies), in particular, UCI part 2 is not reported if $N_2$=0. The index of the TRP whose CSI is reported in the UCI part 1 is also reported as part of the CSI part 1. This reporting can be separate or joint with the information (bitmap) about TRP indices included in the UCI 2.

In one alternative (e.g., embodiment 1A), the UCI carrying the CSI for multiple ($N_g$) gNBs/TRPs can be divided (partitioned) into $N_g$ parts, where UCI part i carries CSI part i corresponding to the CSI of the i-th gNB/TRP. The CSI part 1 has fixed payload (number of bits) and the corresponding UCI part 1 is always reported. The CSI part i (i>1) also has a fixed payload (number of bits) but the CSI part may or may not be reported. The corresponding UCI part i therefore has fixed payload if CSI part i is reported and the UCI part i is not reported if CSI part i is not reported.

The information about the size of the CSI part i or UCI part i is included in the UCI or a CSI part 1. In one example, the information includes a number (N) of TRPs (out of the total $N_g$) whose CSIs are reported in UCI part i (i>1). In another example, the information includes a number ($N_2$) of TRPs (out of the remaining $N_g-N_1$) whose CSIs are reported in UCI part i (i>1), where $N_1$ and $N_2$ respectively are number of TRPs whose CSIs are included in the UCI part 1 and the UCI part i (i>1). In another example, the information includes a bitmap that indicates whether CSI for a TRP associated with the UCI part i (i>1) is reported or not. The length of the bitmap can be $N_2$.

Alternatively, the information about the size of the CSI part i or UCI part i is configured to the UE. For example, such a configuration is signaled via DCI or higher layer (RRC) or MAC CE based signaling.

In one embodiment 2, a UE is triggered via downlink control (DCI) signalling a one-level (i.e., one-part) UCI or two-level (i.e., two-part) UCI for CSI reporting.

If one-level UCI is triggered, then the UE reports full CSI for all Ng TRPs via a single UCI transmission. Or, alternatively, the UE reports full CSI for a subset (M) of Ng TRPs via a single UCI transmission, where M<Ng. In an example, the value M is configured via dynamic DCI based signaling. The information (number or TRP indices) about the subset (comprising M TRPs) is reported via UCI as part of CSI report.

In this example, if two-level UCI is triggered, then the UE reports potentially partial CSI for Ng TRPs via a two-level or two-part UCI. In one example (A) of two-part UCI, the first part (or level) UCI 1 is always reported, and carries a subset of CSI for Ng TRPs. The full CSI for a subset N1 (≤Ng) of Ng TRPs is reported via UCI 1. In an example, N1=1 (which, for example, corresponds to TRP #1 or primary TRP). In another example (A) of two-part UCI, the second part (or level) UCI 2 may or may not be reported. In such example, if N1=Ng or N2=0, then UCI 2 is not reported. In such example, if N1<Ng or N2>1, then UCI 2 may or may not be reported. When the UCI 2 is reported, the UCI 2 may include CSI for a subset of N2 TRPs. The information whether the UCI 2 is reported or not is included in UCI 1 (as part of CSI report). Alternatively, this information is included in the single DCI signaling.

Figure 12:
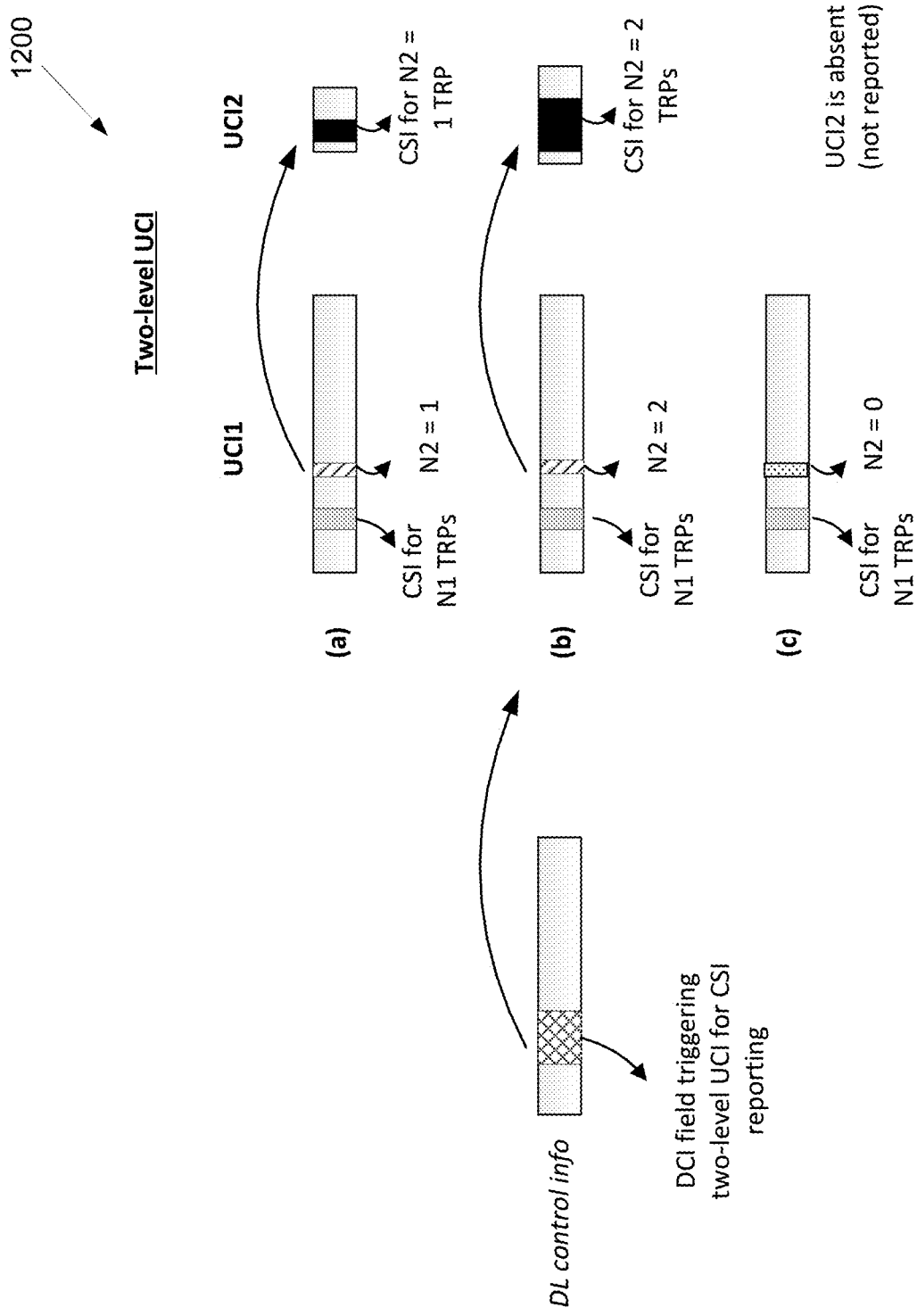
FIG. 12 illustrates an example DCI triggering according to embodiments of the present disclosure.

FIG. 12 illustrates an example DCI triggering 1200 according to embodiments of the present disclosure. The embodiment of the DCI triggering 1200 illustrated in FIG. 12 is for illustration only. FIG. 12 does not limit the scope of the present disclosure to any particular implementation of the configuration 1200.

FIG. 12 illustrates an example of the mentioned embodiment 2 wherein the two-level UCI includes UCI 1 comprising CSI for N1 TRPs, shown in grey, and the information for the number of TRPs (N2) CSI reported for via UCI 2. Three examples are provided for N2. In example (a), N2=1 indicates CSI reporting for N2=1 TRPs via UCI 2. In example (b), N2=2 indicates CSI reporting for N2=2 TRPs via UCI 2. In example (c), N2=0 indicates the absence of the UCI 2.

The value of (Ng, N1, N2) is determined/configured according to one of the following schemes. In scheme 2-1, the value of Ng is configured to the UE (e.g., as number of TRPs or as number of CSI-RS resource sets). This configuration can be dynamic via DCI signaling, or semi-static higher layer RRC signaling, or intermediate MAC CE based signaling. The maximum number TRPs CSI can be reported for by the UE is Ng. The value of (N1, N2) is determined according to at least one of the following alternatives.

In one alternative of Alt 2-1, (N1, N2) is predetermined (fixed), where N1+N2=Ng. For example, N1=1 and N2=Ng-1. The total number of TRPs CSI reported for is M=Ng.

In one alternative of Alt 2-2, N1 is predetermined (fixed), where 1<=N1<=Ng. For example, N1=1. N2 is reported by the UE (as part of CSI report via UCI 1), where 0<=N2<=Ng-N1. The total number of TRPs CSI reported for (M) is between N1 and Ng, N1<=M=N1+N2<=Ng. Note that if N2=0, then UCI 2 is not reported.

In one alternative of Alt 2-3, (N1, N2) is predetermined (fixed), where N1+N2=M<Ng. For example, N1=1 and N2=M-1. The total number of TRPs CSI reported for is M<Ng. The value M is either predetermined or configured.

In one alternative of Alt 2-4, N1 is predetermined (fixed), where 1<=N1<=M<Ng). For example, N1=1. N2 is reported by the UE (as part of CSI report via UCI 1), where 0<=N2<=M-N1). The value M is either predetermined or configured. The total number of TRPs CSI reported for (M) is between N1 and M=N1+N2<Ng. Note that if N2=0, then UCI 2 is not reported.

In such alternatives (Alt 2-1 through Alt 2-4), the information (number or/and TRP indices) whose CSI is reported via UCI 1 and UCI 2 is reported according to some of the examples/alternatives in the aforementioned embodiment 1.

In one embodiment of scheme 2-2, the value of (N1, N2) is configured to the UE (e.g., as number of TRPs or as number of CSI-RS resource sets). This configuration can be dynamic via DCI signaling, or semi-static higher layer RRC signaling, or intermediate MAC CE based signaling. The maximum number of TRPs CSI can be reported for by the UE is N1+N2, where CSI for N1 TRPs is reported via UCI 1 and that for N2 TRPs may or may not be reported via UCI 2. When the UCI 2 is reported, the UCI 2 may include CSI for a subset of N2 TRPs. The information about a subset of N2 TRPs CSI reported for via the UCI 2 is included in the UCI 1. In one example, N1=1 (fixed, hence need not be configured).

In one embodiment of scheme 2-3, the value of (N1, Ng) is configured to the UE (e.g., as number of TRPs or as number of CSI-RS resource sets). This configuration can be dynamic via DCI signaling, or semi-static higher layer RRC signaling, or intermediate MAC CE based signaling. The maximum number of TRPs CSI can be reported for by the UE is Ng. The CSI for N1 TRPs is reported via UCI 1 and that for Ng-N1 TRPs may or may not be reported via UCI 2. When the UCI 2 is reported, the UCI 2 may include CSI for a subset of Ng-N1 TRPs. The information about a subset of Ng-N1 TRPs CSI reported for via the UCI 2 is included in the UCI 1. In one example, N1=1 (fixed, hence need not be configured).

In one embodiment of scheme 2-4, the value of (N2, Ng) is configured to the UE (e.g., as number of TRPs or as number of CSI-RS resource sets). This configuration can be dynamic via DCI signaling, or semi-static higher layer RRC signaling, or intermediate MAC CE based signaling. The maximum number of TRPs CSI can be reported for by the UE is Ng. The CSI for Ng-N2 TRPs is reported via UCI 1 and that for N2 TRPs may or may not be reported via UCI 2. When the UCI 2 is reported, the UCI 2 may include CSI for a subset of N2 TRPs. The information about a subset of N2 TRPs CSI reported for via the UCI 2 is included in the UCI 1.

In one embodiment of scheme 2-5, the value of (N1, N2, Ng) is configured to the UE (e.g., as number of TRPs or as number of CSI-RS resource sets), where N1+N2≤Ng. This configuration can be dynamic via DCI signaling, or semi-static higher layer RRC signaling, or intermediate MAC CE based signaling. The maximum number of TRPs CSI can be reported for by the UE is N1+N2, where CSI for N1 TRPs is reported via UCI 1 and that for N2 TRPs may or may not be reported via UCI 2. When the UCI 2 is reported, the UCI 2 may include CSI for a subset of N2 TRPs. When N1+N2<Ng, a first subset of TRPs out of Ng TPRs is selected for the UCI 1 transmission and a second subset of TRPs out of Ng TRPs is selected for the UCI 2 transmission, where the two subsets are disjoint (i.e., does not have any common TRP). The information (number or TRP indices) about the two subsets are reported via the UCI 1.

In another example (B) of two-part UCI, the first part (or level) UCI 1 is always reported, and carries a subset of CSI for Ng TRPs. A partial CSI for Ng TRPs is reported via the UCI 1, where the partial CSI corresponds to a subset (S1) of all CSI components (S) that are configured to be reported.

In this example (B) of two-part UCI, the second part (or level) UCI 2 may or may not be reported. In such example, if N1=Ng or N2=0, then the UCI 2 is not reported. In such example, if N1<Ng or N2>1, then the UCI 2 may or may not be reported. When the UCI 2 is reported, the UCI 2 may include a remaining CSI for Ng TRPs, where the remaining CSI corresponds to the remaining CSI components, S-S1 (S minus S1). The information whether the UCI 2 is reported or not is included in the UCI 1 (as part of CSI report). Alternatively, this information is included in the single DCI signaling.

The set of all CSI components (S) comprise at least one of layer indicator (LI), CRI, RI, CQI, and PMI, where some of the components (e.g., CQI, PMI) can be configured with either wideband (WB) or subband (SB) frequency granularity for CSI reporting.

In one embodiment 2A, which is a variation of embodiment 2, a UE is triggered via downlink control (DCI) signalling a one-level (i.e., one-part) UCI for CSI reporting, where details about the one-level UCI is according to the mentioned embodiment 2.

In one embodiment 2B, which is a variation of embodiment 2, a UE is triggered via downlink control (DCI) signalling a two-level (i.e., two-part) UCI for CSI reporting, where details about the two-level UCI is according to the mentioned embodiment 2.

In one embodiment 2C, which is a variation of embodiment 2, a UE is triggered via downlink control (DCI) signalling a one-level (i.e., one-part) UCI or multi-level (i.e., two-part) UCI for CSI reporting, where details about the multi-level UCI is according to the mentioned embodiment 1.

In one embodiment 3, a UE is triggered via downlink control (DCI) signalling a one-level (i.e., one-part) UCI or two-level (i.e., two-part) UCI for CSI reporting, where the DCI can be a one-level DCI or a two-level (DCI 1, DCI 2). When the DCI is one-level, the UCI for CSI reporting is according to the mentioned embodiment 2, or the mentioned embodiment's variations 2A-2C.

When the DCI is two-level (DCI 1, DCI 2), the UCI for CSI reporting is according to at least one of the following alternatives.

In one alternative of Alt 3-1, UCI related information is configured via the first level DCI1 regardless of whether the second level DCI 2 is present (transmitted) or absent (not transmitted), where the UCI for CSI reporting is according to the mentioned embodiment 2, or the mentioned embodiment's variations 2A-2C.

In one alternative of Alt 3-2, if one-level UCI is triggered, then the one-level UCI is triggered via the first level DCI 1 regardless of whether the second level DCI 2 is present (transmitted) or absent (not transmitted). If two-level UCI is triggered, then UCI 1 related information is configured via the first level DCI 1, where (DCI 1, UCI 1) is always present (transmitted/reported); and UCI 2 related information is configured via DCI 1 (e.g., when DCI2 is absent) or via DCI 2 (e.g., when DCI 2 is present) or via both (DCI 1, DCI 2). Note that UCI 2 may or may not be reported by the UE. The details of such UCI 2 are according to the mentioned embodiment 2, or the mentioned embodiment's variations 2A-2C.

The information whether UCI 2 is reported or not is indicated via DCI, then such information can be included in DCI 1 regardless of whether the DCI 2 is present or not. Alternatively, the information whether the UCI 2 is reported or not is indicated via DCI, then such information is included in the DCI 1 if the DCI 2 is absent, and the such information is included in the DCI 2 otherwise (i.e., DCI2 is present). Note that the presence or absence of DCI 2 can be indicated separately via the DCI 1.

In one embodiment 3A, which is a variation of the mentioned embodiment 3, a UE is triggered via downlink control (DCI) signalling a one-level (i.e., one-part) UCI for CSI reporting, where details about the DCI signalling and the one-level UCI is according to the mentioned embodiment 2 or/and 3.

In one embodiment 3B, which is a variation of the mentioned embodiment 3, a UE is triggered via downlink control (DCI) signalling a two-level (i.e., two-part) UCI for CSI reporting, where details about the DCI signalling and the two-level UCI is according to mentioned embodiment 2 or/and 3.

In one embodiment 3C, which is a variation of embodiment 3, a UE is triggered via downlink control (DCI) signalling a one-level (i.e., one-part) UCI or multi-level (i.e., two-part) UCI for CSI reporting, where details about the DCI signalling and the multi-level UCI is according to the mentioned embodiment 1 or/and 3.

In one embodiment 4, a UE is configured (e.g., via RRC or MAC CE or RRC+MAC CE based signalling) with a maximum number (Ng) of CSI-RS resource sets or/and CSI-IM resource sets for CSI reporting, where each resource set corresponds to (or transmitted from antenna ports of) a gNB/TRP. The UE is configured to report CSI for M TRPs via a one-level or a two-level UCI, where M<Ng and the details about the one-level UCI and the two-level UCI is according to some of the embodiments of this disclosure. The value M is determined according to at least one of the following alternatives.

In one alternative of Alt 4-1, M is fixed (predetermined). For example, M can be fixed depending on UE capability signalling.

In one alternative of Alt 4-2, M is configured via dynamic DCI based signalling (or optionally RRC, or MAC CE based signalling).

In one alternative of Alt 4-3, M is recommended (reported) by the UE as part of CSI report.

When CSI reporting is via one-level UCI, the UE selects a subset of resource sets (TRPs) comprising M out of Ng resource sets, and reports their indices and corresponding CSI using a one-level UCI. Alternatively, the M out of Ng resource sets is configured dynamically via DCI based signalling (or optionally RRC, or MAC CE based signalling).

When a CSI reporting is via two-level UCI, the resource set selection for CSI reporting is according to at least one of the following alternatives. Let N1 and N2 be the number of resource sets CSI reported for via UCI 2 and UCI 2, respectively.

In one alternative of Alt 4A-1, the indices of N1 out of Ng resource sets for CSI reporting via UCI 1 and the indices of N2≤M−N1 out of Ng−N1 resource sets for CSI reporting via UCI 2 are configured dynamically via DCI based signalling (or optionally RRC, or MAC CE based signalling).

In one alternative of Alt 4A-2, the N1 and N2 indices are reported by the UE as part of the CSI report. This reporting is via UCI 1.

In one alternative of Alt 4A-3, a subset of two-level UCI related parameters (e.g., Ng, N1, N2, M, indices of TRPs for UCI 1, or indices of TRPs for UCI 2) is configured dynamically via DCI based signalling (or optionally RRC, or MAC CE based signalling), and the remaining subset of the parameters is reported by the UE as part of the CSI report either only via UCI 1 or both UCI 1 and UCI 2.

In such embodiment, it is assumed that one resource set corresponds to one TRP/gNB. The embodiment is also applicable to the case in which one resource corresponds to one TRP/gNB by replacing Ng resource sets with Ng resources (in a single resource set). Or, optionally, the embodiment is also applicable to the case in which Ng partition (subsets) of resources in a single resource set corresponds to Ng gNBs/TRPs, where each partition (subset) comprises≥resources and corresponds to one TRP/gNB.

In one embodiment 5, a UE is configured/triggered (e.g., via DCI, MAC CE based, RRC signalling) with a full CSI reporting or a partial CSI reporting linked with (or based on) Ng≥1 resource sets, where the details about resource sets are according to embodiment 1 or 4. A few use cases for such CSI reporting include CSI reports for multiple component carriers (CC) in case of carrier aggregation (CA), CSI reports for multi-point transmission schemes (dynamic point selection, non-coherent joint transmission, etc.) in case of multiple TRPs/gNBs based transmission, and beam reports for multi-beam operations (cf., beam management in NR specification).

When full CSI is configured/triggering, CSI for each resource set is reported. This is akin to CSI reporting in case of CA (i.e., CSI report for each CC).

When partial CSI is configured/triggering, CSI for a subset of resource sets (similar to example A in the mentioned embodiment 2) is reported via one-level or two-level UCI, the details of which are according to some of the mentioned embodiments (1-4) of the present disclosure. Alternatively, when partial CSI is configured/triggering, partial CSI for each resource set (similar to example B in embodiment 2) is reported via one-level or two-level UCI, the details of which are according to some of the mentioned embodiments (1-4) of the present disclosure.

The CSI reporting via two-level UCI supported in NR specification can be extended to support proposed partial CSI reporting. In particular, information (X) about the resource sets CSI reported for is included in UCI 1 if Ng>1.

Note that if Ng=1, then information (X) is not reported. Note also that information (X) is not reported if full CSI reporting is configured/triggered. In other words, information (X) is reported via UCI 1 if Ng>1 and partial CSI reporting is configured/triggered.

In one example, the information (X) corresponds to RI={RI 1, RI 2, . . . , $RI_{Ng}$}, where $RI_i$ is the number of layers reported for the i-th resource set: $RI_i=0$ implies that CSI is not reported for i-th resource set (or number of layers transmitted from i-th resource set=0); and $RI_i>0$ implies that CSI is reported for i-th resource set and number of layers transmitted from i-th resource set=$RI_i$).

For instance, if Ng=2, then UCI 1 includes RI=(RI1, RI2), and when (RI1, RI2)=(r1,0), r1>0: UCI 1 includes CSI1 (CSI report for first resource set); and/or UCI 2 is absent or does not include CSI2 (since number of layers reported for second resource set is zero, i.e., CSI2 is not reported); when (RI1, RI2)=(0,r2), r2>0: UCI 1 includes CSI2 (CSI report for second resource set); and/or UCI 2 is absent or does not include CSI1 (since number of layers reported for first resource set is zero, i.e., CSI1 is not reported); and when (RI1, RI2)=(r1,r2), r1, r2>0: UCI 1 includes CSI1 (CSI report for first resource set); and/or UCI 2 is present (reported) and includes CSI2 (CSI report for second resource set).

Note that rank does not need to be reported separately with the CSI report (CSI 1 or CSI 2) in this example since the rank is already reported via UCI 1.

In another example, the information (X) corresponds to bitmap I={I 1, I 2, . . . , $I_{Ng}$}, where $I_i$ indicates whether or not CSI is reported for the i-th resource set: $I_i=0$ implies that CSI is not reported for i-th resource set; and $I_i=1$ implies that CSI is reported for i-th resource set.

For instance, if Ng=2, then UCI 1 includes I=(I1, I2), and when (I1, I2)=(1,0): UCI 1 includes CSI1 (CSI report for first resource set); and/or UCI 2 is absent or does not include CSI2, when (I1, I2)=(0,1): UCI 1 includes CSI2 (CSI report for second resource set); and/or UCI 2 is absent or does not include CSI1, and when (I 1, I 2)=(1, 1): UCI 1 includes CSI1 (CSI report for first resource set); and/or UCI 2 is present (reported) and includes CSI 2 (CSI report for second resource set).

Note that RI may need to be reported for each CSI report (CSI 1 or CSI 2) in this example.

In one embodiment 5A, a UE is configured with Ng>1 resource sets according to some of the embodiments of this disclosure, and when none of the CSIs comprises two parts (or, e.g., all of CSI reports are configured with WB frequency granularity for CSI reporting on PUCCH), the CSI reporting is according to one of the following alternatives.

In one alternative of Alt 5-1 (one-level UCI), if none of the CSI reports for transmission on a PUCCH is of two parts, the CSI fields of all CSI reports, in the order from upper part to lower part in TABLE 1, are mapped to the (one-level) UCI bit sequence $a_0, a_1, a_2, a_3, \ldots, a_{A-1}$ starting with $a_0$, where Oi=number of bits to report WB CSI report #i. In TABLE 1, n=Ng.

In one example, n=Ng=2. If an entry (xi) of information X is xi=1 (or xi>0), then CSI report #i is reported. Otherwise (xi=0), CSI report #i is not reported, and zero padding bits of length Oi is inserted.

TABLE 1

Mapping order of CSI reports to UCI bit sequence $a_0$, $a_1, a_2, a_3, \ldots , a_{A-1}$, without two-part CSI report(s)

| UCI bit sequence | CSI report number |
|---|---|
| $a_0$ | Information X = [x1, x2, . . . , xn], if reported |
| $a_1$ | CSI report #1 as in NR specification, if x1 = 1 (or x1 > 0) |
| $a_2$ | zero padding bits O1, otherwise (x1 = 0) |
| $a_3$ | CSI report #2 as in NR specification, if x2 = 1 (or x2 > 0) |
| . | zero padding bits O2, otherwise (x2 = 0) |
| . | . . . |
| . | CSI report #n as in NR specification, if xn = 1 (or xn > 0) |
| $a_{A-1}$ | zero padding bits On, otherwise (xn = 0) |

In one alternative of Alt 5-2 (two-level UCI), if none of the CSI reports for transmission on a PUCCH is of two parts, two UCI bit sequences (two-level UCI) are generated, $a_0^{(1)}, a_1^{(1)}, a_2^{(1)}, a_3^{(1)}, \ldots, a_{A^{(1)}-1}^{(1)}$ and $a_0^{(2)}, a_1^{(2)}, a_2^{(2)}, a_3^{(2)}, \ldots, a_{A^{(2)}-1}^{(2)}$. The CSI fields of all CSI reports, in the order from upper part to lower part in TABLE 2, are mapped to the UCI bit sequence $a_0^{(1)}, a_1^{(1)}, a_2^{(1)}, a_3^{(1)}, \ldots, a_{A^{(1)}-1}^{(1)}$ starting with $a_0^{(1)}$. The CSI fields of all CSI reports, in the order from upper part to lower part in TABLE 3, are mapped to the UCI bit sequence $a_0^{(2)}, a_1^{(2)}, a_2^{(2)}, a_3^{(2)}, \ldots, a_{A^{(2)}-1}^{(2)}$ starting with $a_0^{(2)}$.

The N1+N2 indices (in increasing order) $i1<i2< \ldots <i_{N1}<i_{N1+1} \ldots <i_{N1+N2}$ of entries (xi) of information X such that xi=1 (or xi>0) are used to indicate CSI report #i1, CSI report #i2 port, CSI report #$i_{N1}$ that are reported via first UCI sequence $a_0^{(1)}, a_1^{(1)}, a_2^{(1)}, a_3^{(1)}, \ldots, a_{A^{(1)}-1}^{(1)}$ and CSI report #$i_{N1+1}$, CSI report #$i_{N1+2}, \ldots$, CSI report #$i_{N1+2}$ that are reported via second UCI sequence $a_0^{(2)}, a_1^{(2)}, a_2^{(2)}, a_3^{(2)}, \ldots, a_{A^{(2)}-1}^{(2)}$. Here N1 is fixed, for example to N1=1, and N2≥0 is reported via information (X). If N2=0, then the second UCI sequence is not reported (i.e., $A^{(2)}=0$ if N2=0). Alternatively, if N2=0 or the length of UCI bit sequence $a_0^{(2)}, a_1^{(2)}, a_2^{(2)}, a_3^{(2)}, \ldots, a_{A^{(2)}-1}^{(2)}$ is less than 3 bits, zeros may be appended to the UCI bit sequence until length equals 3 (i.e., $A^{(2)}≥3$ always). In these tables, n=Ng. In one example, n=Ng=2. The value (N1, N2) is according to some of the embodiments of this disclosure.

TABLE 2

Mapping order of CSI reports to UCI bit sequence $a_0^{(1)}, a_1^{(1)}$, $a_2^{(1)}, a_3^{(1)}, \ldots, a_{A^{(1)}-1}^{(1)}$, without two-part CSI report(s)

| UCI bit sequence | CSI report number |
|---|---|
| $a_0^{(1)}$ | Information X = [x1, x2, . . . , xn], if reported |
| $a_1^{(1)}$ | CSI report #i1 as in NR specification |
| $a_2^{(1)}$ | CSI report #i2 as in NR specification |
| $a_3^{(1)}$ | . . . |
| . | CSI report #$i_{N1}$ as in NR specification |
| . | |
| . | |
| $a_{A^{(1)}-1}^{(1)}$ | |

Where CSI report #1, CSI report #i2, CSI report #$i_{N1}$ in TABLE 2 correspond to the CSI reports in increasing order of CSI report priority values according to NR specification.

TABLE 3

Mapping order of CSI reports to UCI bit sequence $a_0^{(2)}, a_1^{(2)}, a_2^{(2)}, a_3^{(2)}, \ldots, a_{A^{(2)}-1}^{(2)}$, without two-part CSI report(s)

| UCI bit sequence | CSI report number |
|---|---|
| $a_0^{(2)}$ | CSI report #$i_{N1+1}$ as in NR specification |
| $a_1^{(2)}$ | CSI report #$i_{N1+2}$ as in NR specification |
| $a_1^{(2)}$ | ... |
| $a_2^{(2)}$ | CSI report #$i_{N1+N2}$ as in NR specification |
| $a_3^{(2)}$ | |
| . | |
| . | |
| . | |
| $a_{A^{(2)}-1}^{(2)}$ | |

Where CSI report #$i_{N1+1}$, CSI report #$i_{N1+2}$, ..., CSI report #$i_{N1+N2}$ in TABLE 3 correspond to the CSI reports in increasing order of CSI report priority values according to NR specification.

In one embodiment 5B, a UE is configured with Ng>1 resource sets according to some of the mentioned embodiments of the present disclosure, and when at least one of the CSIs comprises two parts, CSI part 1 and part 2, (e.g., at least one of the CSIs is configured with SB frequency granularity for CSI reporting either on PUCCH or PUSCH), then the CSI reporting is via two-level UCI (UCI 1, UCI 2), wherein: UCI 1 and UCI 2 include N1 and N2 CSIs, respectively; information (X) is included in UCI 1; UCI 1 is always present (reported); UCI 2 is absent (not reported) if N2=0, and none of the N1 CSIs reported via UCI 1 is two-part (part 1 and part 2); and UCI 2 is present (reported) if N2>0 or at least one of the N1 CSIs reported via UCI 1 is two-part (part 1 and part 2), part 1 is reported via UCI 1 and part 2 is reported via UCI 2.

If at least one of the CSI reports for transmission on a PUCCH is of two parts, two UCI bit sequences (two-level UCI) are generated, $a_0^{(1)}, a_1^{(1)}, a_2^{(1)}, a_3^{(1)}, \ldots, a_{A^{(1)}-1}^{(1)}$ and $a_0^{(2)}, a_1^{(2)}, a_2^{(2)}, a_3^{(2)}, \ldots, a_{A^{(2)}-1}^{(2)}$. The CSI fields of all CSI reports, in the order from upper part to lower part in TABLE 4, are mapped to the UCI bit sequence $a_0^{(1)}, a_1^{(1)}, a_2^{(1)}, a_3^{(1)}, \ldots, a_{A^{(1)}-1}^{(1)}$, starting with $a_0^{(1)}$.

The CSI fields of all CSI reports, in the order from upper part to lower part in TABLE 5, are mapped to the UCI bit sequence $a_0^{(2)}, a_1^{(2)}, a_2^{(2)}, a_3^{(2)}, \ldots, a_{A^{(2)}-1}^{(2)}$ starting with $a_0^{(2)}$. The N1+N2 indices (in increasing order) $i1<i2<\ldots<i_{N1}<i_{N1+1}\ldots<i_{N1+N2}$ of entries (xi) of information X such that xi=1 (or xi>0) are used to indicate CSI report #i1, CSI report #i2, ..., CSI report #$i_{N1}$ that are reported via first UCI sequence $a_0^{(1)}, a_1^{(1)}, a_2^{(1)}, a_3^{(1)}, \ldots, a_{A^{(1)}-1}^{(1)}$ and CSI report #$i_{N1+1}$, CSI report #$i_{N1+2}$, ..., CSI report #$i_{N1+N2}$ that are reported via second UCI sequence $a_0^{(2)}, a_1^{(2)}, a_2^{(2)}, a_3^{(2)}, \ldots, a_{A^{(2)}-1}^{(2)}$. Here N1 is fixed, for example to N1=1, and N2≥0 is reported via information (X). If N2=0, then the second UCI sequence is not reported (i.e., $A^{(2)}=0$ if N2=0).

Alternatively, if N2=0 or the length of UCI bit sequence $a_0^{(2)}, a_1^{(2)}, a_2^{(2)}, a_3^{(2)}, \ldots, a_{A^{(2)}-1}^{(2)}$ is less than 3 bits, zeros may be appended to the UCI bit sequence until length equals 3 (i.e., $A^{(2)}\geq 3$ always). In these tables, n=Ng. In one example, n=Ng=2. The value (N1, N2) is according to some of the embodiments of this disclosure.

TABLE 4

Mapping order of CSI reports to UCI bit sequence $a_0^{(1)}, a_1^{(2)}, a_2^{(1)}, a_3^{(1)}, \ldots, a_{A^{(1)}-1}^{(1)}$, with two-part CSI report(s)

| UCI bit sequence | CSI report number |
|---|---|
| $a_0^{(1)}$ | Information X = [x1, x2, ..., xn], if reported |
| $a_1^{(2)}$ | CSI report #i1 if CSI report #i1 is not of two parts, |
| $a_2^{(1)}$ | or |
| $a_3^{(1)}$ | CSI report #i1, CSI part 1, if CSI report #i1 is of two parts, as described in NR specification |
| . | CSI report #i2 if CSI report #i2 is not of two parts, |
| . | or |
| $a_{A^{(1)}-1}^{(1)}$ | CSI report #i2, CSI part 1, if CSI report #i2 is of two parts, as described in NR specification |
| | ... |
| | CSI report # $i_{N1}$ if CSI report # $i_{N1}$ is not of two parts, or |
| | CSI report # $i_{N1}$, CSI part 1, if CSI report # $i_{N1}$ is of two parts, as described in NR specification |

Where CSI report #1, CSI report #i2, ..., CSI report #$i_{N1}$ in TABLE 4 correspond to the CSI reports in increasing order of CSI report priority values according to NR specification.

TABLE 5

Mapping order of CSI reports to UCI bit sequence $a_0^{(2)}, a_1^{(2)}, a_2^{(2)}, a_3^{(2)}, \ldots, a_{A^{(2)}-1}^{(2)}$, with two-part CSI report(s)

| UCI bit sequence | CSI report number |
|---|---|
| $a_0^{(2)}$ | CSI report #$i_{N1+1}$, CSI part 2 wideband, as described in NR specification if CSI part 2 exists for CSI report #$i_{N1+1}$ |
| $a_1^{(2)}$ | |
| $a_2^{(2)}$ | CSI report #$i_{N1+2}$, CSI part 2 wideband, as described in NR specification if CSI part 2 exists for CSI report # $i_{N1+2}$ |
| $a_3^{(2)}$ | |
| . | ... |
| . | CSI report #$i_{N1+N2}$, CSI part 2 wideband, as described in NR specification if CSI part 2 exists for CSI report # $i_{N1+N2}$ |
| $a_{A^{(2)}-1}^{(2)}$ | CSI report # $i_{N1+1}$, CSI part 2 subband, as described in NR specification if CSI part 2 exists for CSI report # $i_{N1+1}$ |
| | CSI report # $i_{N1+2}$ CSI part 2 subband, as described in NR specification if CSI part 2 exists for CSI report # $i_{N1+2}$ |
| | ... |
| | CSI report # $i_{N1+N2}$, CSI part 2 subband, as described in NR specification if CSI part 2 exists for CSI report # $i_{N1+N2}$ |

Where CSI report #$i_{N1+1}$, CSI report #$i_{N1+2}$, ..., CSI report #$i_{N1+N2}$ in TABLE 5 correspond to the CSI reports in increasing order of CSI report priority values according to NR specification.

For CSI on PUSCH, two UCI bit sequences are generated, $a_0^{(1)}, a_1^{(1)}, a_2^{(1)}, a_3^{(1)}, \ldots, a_{A^{(1)}-1}^{(1)}$ and $a_0^{(2)}, a_1^{(2)}, a_2^{(2)}, a_3^{(2)}, \ldots, a_{A^{(2)}-1}^{(2)}$. The CSI fields of all CSI reports in the order from upper part to lower part, are mapped to the UCI bit sequence $a_0^{(1)}, a_1^{(1)}, a_2^{(1)}, a_3^{(1)}, \ldots, a_{A^{(1)}-1}^{(1)}$ starting with $a_0^{(1)}$. The CSI fields of all CSI reports, in the order from upper part to lower part, are mapped to the UCI bit sequence $a_0^{(2)}, a_1^{(2)}, a_2^{(2)}, a_3^{(2)}, \ldots, a_{A^{(2)}-1}^{(2)}$ starting with $a_0^{(2)}$.

The N1+N2 indices (in increasing order) $i1<i2<\ldots<i_{N1}<i_{N1+1}\ldots<i_{N1+N2}$ of entries (xi) of information X such that xi=1 (or xi>0) are used to indicate CSI report #i1, CSI report #i2, ..., CSI report #$i_{N1}$ that are reported via first UCI sequence $a_0^{(1)}, a_1^{(1)}, a_2^{(1)}, a_3^{(1)}, \ldots, a_{A^{(1)}-1}^{(1)}$ and CSI report #$i_{N1+1}$, CSI report #$i_{N1+2}$, ..., CSI report #$i_{N1+N2}$ that are reported via second UCI sequence $a_0^{(2)}, a_1^{(2)}, a_2^{(2)}, a_3^{(2)}, \ldots, a_{A^{(2)}-1}^{(2)}$. Here N1 is fixed, for example to N1=1, and N2≥0 is reported via information (X). If N2=0, then the second UCI sequence is not reported (i.e., $A^{(2)}=0$ if N2=0). Alternatively, if N2=0 or the length of UCI bit sequence $a_0^{(2)}, a_1^{(2)}, a_2^{(2)}, a_3^{(2)}, \ldots, a_{A^{(2)}-1}^{(2)}$, is less than 3 bits, zeros may be appended to the UCI bit sequence until length equals 3 (i.e., $A^{(2)} \geq 3$ always). In these tables, n=Ng. In one example, n=Ng=2. The value (N1, N2) is according to some of the embodiments of this disclosure.

TABLE 6

Mapping order of CSI reports to UCI bit sequence $a_0^{(1)}$, $a_1^{(1)}, a_2^{(1)}, a_3^{(1)}, \ldots, a_{A^{(1)}-1}^{(1)}$, two-part CSI report(s)

| UCI bit sequence | CSI report number |
|---|---|
| $a_0^{(1)}$ | Information X = [x1, x2, . . . , xn], if reported |
| $a_1^{(1)}$ | CSI part 1 of CSI report #i1 as described in NR specification |
| $a_2^{(1)}$ | |
| $a_3^{(1)}$ | CSI part 1 of CSI report #i2 as described in NR specification |
| . | . . . |
| . | |
| . | CSI part 1 of CSI report #$i_{N1}$ as described in NR specification |
| $a_{A^{(1)}-1}^{(1)}$ | |

Where CSI report #1, CSI report #i2, . . . , CSI report #$i_{N1}$ in TABLE 6 correspond to the CSI reports in increasing order of CSI report priority values according to NR specification.

TABLE 7

Mapping order of CSI reports to UCI bit sequence $a_0^{(2)}, a_1^{(2)}$, $a_2^{(2)}, a_3^{(2)}, \ldots a_{A^{(2)}-1}^{(2)}$, with two-part CSI report(s)

| UCI bit sequence | CSI report number |
|---|---|
| $a_0^{(2)}$ | CSI report #$i_{N1+1}$, CSI part 2 wideband, as described in NR specification if CSI part 2 exists for CSI report # $i_{N1+1}$ |
| $a_1^{(2)}$ | |
| $a_2^{(2)}$ | CSI report #$i_{N1+2}$, CSI part 2 wideband, as described in NR specification if CSI part 2 exists for CSI report #$i_{N1+2}$ |
| $a_3^{(2)}$ | |
| . | . . . |
| . | CSI report #$i_{N1+N2}$, CSI part 2 wideband, as described in NR specification if CSI part 2 exists for CSI report #$i_{N1+N2}$ |
| $a_{A^{(2)}-1}^{(2)}$ | CSI report #$i_{N1+1}$, CSI part 2 subband, as described in NR specification if CSI part 2 exists for CSI report #$i_{N1+1}$ CSI report #$i_{N1+2}$, CSI part 2 subband, as described in NR specification if CSI part 2 exists for CSI report #$i_{N1+2}$ . . . CSI report #$i_{N1+N2}$ CSI part 2 subband, as described in NR specification if CSI part 2 exists for CSI report #$i_{N1+N2}$ |

Where CSI report #$i_{N1+1}$, CSI report #$i_{N1+2}$, . . . , CSI report #$i_{N1+N2}$ in TABLE 7 correspond to the CSI reports in increasing order of CSI report priority values according to NR specification.

In one embodiment 6, a CSI report in embodiments of this disclosure can correspond to a beam report (similar to a beam report in NR specification) comprising a beam metric or/and a resource indicator. A few examples of beam metric are as follows. In one example of L1-RSRP, similar to NR specification, the L1-RSRP indicates power level of a resource such as NZP CSI-RS or SSB. In one example of L1-SINR, L1-SINR indicates a ratio of signal power and (noise+) interference power, where the signal power is determined using NZP CSI-RS resource and the interference power is determined using a ZP CSI-RS or/and NZP CSI-RS resource.

A few examples of the resource indicator are as follows. In one example of CRI, similar to NR specification, the CRI indicates an NZP CSI-RS resource. In one example of SSBRI, similar to NR specification, the SSBRI indicates an SSB resource.

In one example, a UE is configured/triggered with a "dynamic" beam reporting for K≤N beam reports where N is a number of beams the UE is configured to monitor, and K is a number of beams (out of N beams) the UE reports the beam reports for. When K=N, the beam reporting corresponds to a full beam reporting and when K<N, the beam reporting corresponds to a partial beam reporting, where the details about the "full" and "partial" beam reporting are (similar to or) according to a straightforward extension of the full and partial CSI reporting in the mentioned embodiments of the present disclosure. The details about configuration or/and triggering of K beam reports are similar to that explained in the mentioned embodiments of the present disclosure.

In one example, a beam is equivalent to a resource such as NZP CSI-RS and SSB. In another example, a beam is equivalent to a port. In another example, a beam is equivalent to any other component which is functionally equivalent to a beam in this disclosure.

In one embodiment 7, a UE is configured/triggered with a "dynamic" beam or CSI reporting according to the mentioned embodiments of the present disclosure via an uplink channel. At least one of the following alternatives is used for the uplink channel.

In one alternative of Alt 7-1, the uplink channel is PUCCH for both UCI part 1 and UCI part 2. In one alternative of Alt 7-2, the uplink channel is PUCCH for UCI part 1 and PUSCH for UCI part 2. In one alternative of Alt 7-3, the uplink channel is PUSCH for UCI part 1 and PUSCH for UCI part 2. In one alternative of Alt 7-4, the uplink channel is PUSCH for both UCI part 1 and UCI part 2.

In one example, only one of the above alternatives (e.g., Alt 7-2 or Alt 7-4) is (fixed) used for dynamic beam or CSI reporting. In another example, an alternative (from Alt 7-1 through 7-4) for dynamic beam or CSI reporting is configured to the UE. This configuration can be via higher layer (e.g., RRC) signaling or via DCI based signaling. Also, this configuration can either be joint with at least one configuration parameter or separate using a separate parameter or field.

In one example of Alt 7-2, the UCI part 1 comprises WB components of all CSI/beam reports and the UCI part 2 comprises SB components of all CSI/beam report. The UCI part 1 has a fixed payload and is reported via PUCCH. The UCI part 2 has a variable payload and is reported via PUSCH. To ensure that the UCI part 1 payload is fixed, a fixed number of zero padding bits (similar to WB CSI reporting in NR specification) can be added to the bits for CSI or beam reporting. The location of these zero padding bits can either be in the front (or beginning) or in the end or in between two segments of the WB components.

Also, when UCI part 2 is configured to be reported via PUSCH, and UE doesn't report UCI part 2 (since the UCI 2 is absent or not reported based on the dynamic CSI/beam reporting), then PUSCH resource allocated for UCI part 2 can be used for UL data transmission (assuming that the UCI transmission is scheduled together with UL data).

The location of UCI part 2 of a two-part UCI or UCI 2, . . . , $UCI_N$ of a N-part UCI can be determined implicitly. For instance, the UL resource allocated for the UCI part 2 or additional UCI(s) can be determined based on that for the UCI part 1. Or, the UL resource allocated for the UCI part 2 or additional UCI(s) can be in a predetermined region of the time-frequency resources allocated (e.g., by the DCI) for the UL data channel (PUSCH) transmission such as in the first one or more symbols in time and starting from the lowest PRB index in frequency.

Alternatively, the location of UCI part 2 of a two-part UCI or UCI 2, . . . , $UCI_N$ of a N-part UCI can be signaled/configured explicitly. In one example, this explicit signaling can be included in the DCI triggering the dynamic CSI or beam reporting. In another example, this explicit signaling can be via other signaling/configuration mechanism whose relevant information is signaled in DCI triggering the dynamic CSI or beam reporting. In another example, this information is signaled to the UE via higher-layer signaling (RRC) or MAC CE. Also, multiple parts of the UCI can be located in the same UL slot. Alternatively, multiple parts of the UCI are located in two UL slots of the same subframe. Alternatively, multiple parts of the UCI are located in two slots of the two different subframes.

Figure 13:
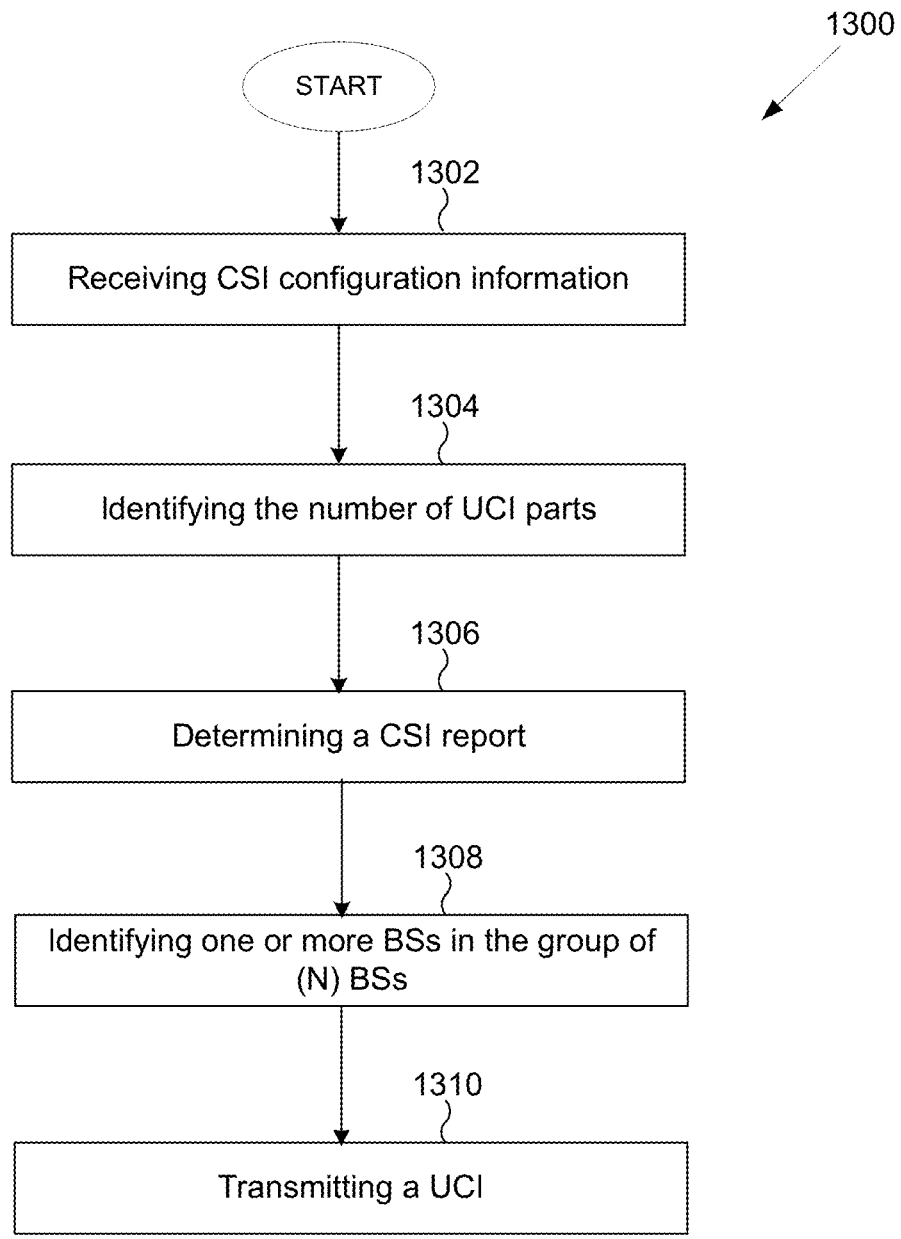
FIG. 13 illustrates a flowchart of a method for operating a UE according to embodiments of the present disclosure.

FIG. 13 illustrates a flowchart of a method 1300 for operating a UE according to embodiments of the present disclosure, as may be performed by a UE (e.g., 111-116 as illustrated in FIG. 1). The embodiment of the method 1300 illustrated in FIG. 13 is for illustration only. FIG. 13 does not limit the scope of the present disclosure to any particular implementation of the configuration 1300.

As illustrated in FIG. 13, the method 1300 begins at step 1302. In step 1302, the UE receives, from at least one base station (BS) of a group of (N) BSs, channel state information (CSI) configuration information including a number of uplink control information (UCI) parts for a CSI reporting.

Next, in step 1304, the UE identifies the number of UCI parts for the CSI reporting.

In one embodiment, a value of the number of UCI parts equals one indicating that the UCI includes one part (UCI 1) or equals two indicating that the UCI includes two parts (UCI 1 and UCI 2).

In one embodiment, when the value of the number of UCI parts equals two indicating that the UCI includes two parts (UCI 1 and UCI 2): the determined CSI report is partitioned into CSI 1 comprising CSI for $N_1$ BSs and CSI 2 comprising CSI for $N_2$ BSs, where $N \geq N_1+N_2$, $N_1 \geq 1$, and $N_2 \geq 0$; the UCI 1 includes CSI 1 and an indicator for indicating a number of information bits for the UCI 2; and the UCI 2 includes CSI 2, where the number of information bits for the UCI 1 is fixed and the number of information bits for the UCI 2 is variable.

In one embodiment, when the value of the number of UCI parts equals two indicating that the UCI includes two parts (UCI 1 and UCI 2): the uplink channel is a physical uplink control channel (PUCCH) for the UCI 1; and the uplink channel is a physical uplink shared channel (PUSCH) for the UCI 2.

In one embodiment, the CSI report includes CSI for each of the group of (N) BSs when the value of the number of UCI parts equals one indicating that the UCI includes one part (UCI 1), and the CSI report includes CSI for each of a subset of the group of (N) BSs, the subset of the group of (N) BSs comprising $N_1$ BSs where $N_1 < N$.

Subsequently, in step 1306, the UE determines a CSI report based on the identified number of UCI parts.

Subsequently, in step 1308, the UE identifies one or more BSs in the group of (N) BSs to transmit the determined CSI report.

Finally, in step 1310, the UE transmits, to the one or more identified BSs, via an uplink channel, a UCI including the determined CSI report.

In one embodiment, the UCI includes the identified number of UCI parts each of which includes a part of the determined CSI report.

In one embodiment, the UE further receives, from the at least one BS of the group of (N) BSs, downlink control information (DCI) and identifies the number of UCI parts for the CSI reporting based on the DCI.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
   a transceiver configured to receive, from at least one base station (BS) of a group of (N) BSs, channel state information (CSI) configuration information including a number of uplink control information (UCI) parts for a CSI reporting; and
   a processor operably connected to the transceiver, the processor, based on the CSI configuration information, configured to:
   identify the number of UCI parts for the CSI reporting;
   determine a CSI report based on the identified number of UCI parts; and
   identify one or more BSs in the group of (N) BSs to transmit the determined CSI report,
   wherein the transceiver is further configured to transmit, to the one or more identified BSs, via an uplink channel, a UCI including the determined CSI report, and
   wherein the UCI includes the identified number of UCI parts each of which includes a part of the determined CSI report.

2. The UE of claim 1, wherein a value of the number of UCI parts equals one indicating that the UCI includes one part (UCI 1) or equals two indicating that the UCI includes two parts (UCI 1 and UCI 2).

3. The UE of claim 2, wherein when the value of the number of UCI parts equals two indicating that the UCI includes two parts (UCI 1 and UCI 2):
   the determined CSI report is partitioned into CSI 1 comprising CSI for $N_1$ BSs and CSI 2 comprising CSI for $N_2$ BSs, where $N \geq N_1+N_2$, $N_1 \geq 1$, and $N_2 \geq 0$;
   the UCI 1 includes CSI 1 and an indicator for indicating a number of information bits for the UCI 2; and
   the UCI 2 includes CSI 2,
   where a number of information bits for the UCI 1 is fixed and the number of information bits for the UCI 2 is variable.

4. The UE of claim 2, wherein when the value of the number of UCI parts equals two indicating that the UCI includes two parts (UCI 1 and UCI 2):
   the uplink channel is a physical uplink control channel (PUCCH) for the UCI 1; and
   the uplink channel is a physical uplink shared channel (PUSCH) for the UCI 2.

5. The UE of claim 2, wherein the determined CSI report includes CSI for each of the group of (N) BSs when the value of the number of UCI parts equals one indicating that the UCI includes one part (UCI 1).

6. The UE of claim 1, wherein the determined CSI report includes CSI for each of a subset of the group of (N) BSs, the subset of the group of (N) BSs comprising $N_1$ BSs where $N_1<N$.

7. The UE of claim 1, wherein:
the transceiver is further configured to receive, from the at least one BS of the group of (N) BSs, downlink control information (DCI); and
the processor is further configured to identify the number of UCI parts for the CSI reporting based on the DCI.

8. A base station (BS) in a wireless communication system, the BS comprising:
a processor configured to determine a number of uplink control information (UCI) parts for a channel state information (CSI) reporting; and
a transceiver operably connected to the processor, the transceiver configured to:
transmit, to a user equipment (UE) CSI configuration information including the determined number of UCI parts for the CSI reporting; and
receive, from the UE via an uplink channel, a UCI including a CSI report,
wherein the CSI report is based on the determined number of UCI parts,
wherein the UCI includes the determined number of UCI parts each of which includes a part of the CSI report, and
wherein the BS is at least one BS of a group of (N) BSs.

9. The BS of claim 8, wherein a value of the number of UCI parts equals one indicating that the UCI includes one part (UCI 1) or equals two indicating that the UCI includes two parts (UCI 1 and UCI 2).

10. The BS of claim 9, wherein when the value of the number of UCI parts equals two indicating that the UCI includes two parts (UCI 1 and UCI 2):
the CSI report is partitioned into CSI 1 comprising CSI for $N_1$ BSs and CSI 2 comprising CSI for $N_2$ BSs, where $N \geq N_1+N_2$, $N_1 \geq 1$, and $N_2 \geq 0$;
the UCI 1 includes CSI 1 and an indicator for indicating a number of information bits for the UCI 2; and
the UCI 2 includes CSI 2,
where a number of information bits for the UCI 1 is fixed and the number of information bits for the UCI 2 is variable.

11. The BS of claim 10, wherein when the value of the number of UCI parts equals two indicating that the UCI includes two parts (UCI 1 and UCI 2):
the uplink channel is a physical uplink control channel (PUCCH) for the UCI 1; and
the uplink channel is a physical uplink shared channel (PUSCH) for the UCI 2.

12. The BS of claim 9, wherein the CSI report includes CSI for each of the group of (N) BSs when the value of the number of UCI parts equals one indicating that the UCI includes one part (UCI 1).

13. The BS of claim 8, wherein the CSI report includes CSI for each of a subset of the group of (N) BSs, the subset of the group of (N) BSs comprising $N_1$ BSs where $N_1<N$.

14. The BS of claim 8, wherein the transceiver is further configured to transmit, to the UE, downlink control information (DCI) including the determined number of UCI parts for the CSI reporting.

15. A method of a user equipment (UE) in a wireless communication system, the method comprising:
receiving, from at least one base station (BS) of a group of (N) BSs, channel state information (CSI) configuration information including a number of uplink control information (UCI) parts for a CSI reporting;
identifying the number of UCI parts for the CSI reporting;
determining a CSI report based on the identified number of UCI parts;
identifying one or more BSs in the group of (N) BSs to transmit the determined CSI report; and
transmitting, to the one or more identified BSs, via an uplink channel, a UCI including the determined CSI report,
wherein the UCI includes the identified number of UCI parts each of which includes a part of the determined CSI report.

16. The method of claim 15, wherein a value of the number of UCI parts equals one indicating that the UCI includes one part (UCI 1) or equals two indicating that the UCI includes two parts (UCI 1 and UCI 2).

17. The method of claim 16, wherein when the value of the number of UCI parts equals two indicating that the UCI includes two parts (UCI 1 and UCI 2):
the determined CSI report is partitioned into CSI 1 comprising CSI for $N_1$ BSs and CSI 2 comprising CSI for $N_2$ BSs, where $N \geq N_1+N_2$, $N_1 \geq 1$, and $N_2 \geq 0$;
the UCI 1 includes CSI 1 and an indicator for indicating a number of information bits for the UCI 2; and
the UCI 2 includes CSI 2,
where a number of information bits for the UCI 1 is fixed and the number of information bits for the UCI 2 is variable.

18. The method of claim 16, wherein when the value of the number of UCI parts equals two indicating that the UCI includes two parts (UCI 1 and UCI 2):
the uplink channel is a physical uplink control channel (PUCCH) for the UCI 1; and
the uplink channel is a physical uplink shared channel (PUSCH) for the UCI 2.

19. The method of claim 16, wherein the determined CSI report includes CSI for each of the group of (N) BSs when the value of the number of UCI parts equals one indicating that the UCI includes one part (UCI 1.

20. The method of claim 15, further comprising:
receiving, from the at least one BS of the group of (N) BSs, downlink control information (DCI); and
identifying the number of UCI parts for the CSI reporting based on the DCI.

* * * * *